US012437538B1

(12) United States Patent
Fayling et al.

(10) Patent No.: US 12,437,538 B1
(45) Date of Patent: Oct. 7, 2025

(54) SYSTEMS AND METHODS FOR AUTOMATED ANALYSIS OF VIDEO STREAM DATA ACQUIRED AT A LOCATION FROM MULTIPLE IP VIDEO CAMERAS

(71) Applicant: Skai Holding Co. LLC, Raleigh, NC (US)

(72) Inventors: Jason Fayling, Newnan, GA (US); Robert Mark Queen, Raleigh, NC (US); Ken Edward Kennedy, Westminster, SC (US)

(73) Assignee: SKAI HOLDING CO. LLC, Raleigh, NC (US)

( * ) Notice: Subject to any disclaimer, the term of this patent is extended or adjusted under 35 U.S.C. 154(b) by 0 days.

(21) Appl. No.: 18/956,208

(22) Filed: Nov. 22, 2024

Related U.S. Application Data

(63) Continuation-in-part of application No. 18/376,610, filed on Oct. 4, 2023.
(Continued)

(51) Int. Cl.
*G06V 20/40* (2022.01)
*G06V 20/52* (2022.01)
(Continued)

(52) U.S. Cl.
CPC .............. *G06V 20/44* (2022.01); *G06V 20/52* (2022.01); *G06V 40/20* (2022.01); *H04N 7/181* (2013.01)

(58) Field of Classification Search
CPC ........ G06V 20/44; G06V 20/52; G06V 40/20; H04N 7/181
See application file for complete search history.

(56) References Cited

U.S. PATENT DOCUMENTS 10,235,762 B1 3/2019 Wylie
10,412,346 B1 9/2019 Yu
(Continued)

OTHER PUBLICATIONS

Ye, Liang, et al. "Physical Violence Detection Based on Distributed Surveillance Cameras." Mobile Networks and Applications 27.4 (2022): 1688-1699.
(Continued)

*Primary Examiner* — Boubacar Abdou Tchoussou
(74) *Attorney, Agent, or Firm* — Thomas | Horstemeyer, LLP

(57) ABSTRACT

Various examples are related to identifying and monitoring an event of interest at a location, such as a business. In one example, a method includes providing an IP camera network including passive IP enabled video cameras installed at a location. The method includes identifying an event of interest for monitoring by acquiring video stream information from one or more of the passive IP enabled video cameras; transmitting the video stream information to a network video recorder ("GPU server") device; and processing the video stream information via a visual artificial intelligence engine. The method can generate a start time for the identified event; acquire additional video stream information associated with the identified event; transmit the additional video stream information to the GPU server device; process the additional video stream information via the visual artificial intelligence engine; and generate information associated with the identified event with can be configured for use.

18 Claims, 9 Drawing Sheets

Related U.S. Application Data

(60) Provisional application No. 63/417,935, filed on Oct. 20, 2022.

(51) Int. Cl.
    *G06V 40/20*    (2022.01)
    *H04N 7/18*    (2006.01)

(56) References Cited

U.S. PATENT DOCUMENTS

| | | |
|---|---|---|
| 11,816,641 B2 | 11/2023 | Rokadia |
| 2016/0042621 A1* | 2/2016 | Hogg .................. H04N 23/64 348/155 |
| 2017/0228603 A1 | 8/2017 | Johnson |
| 2021/0157834 A1 | 5/2021 | Sivasubramanian |
| 2021/0352090 A1 | 11/2021 | Kim et al. |
| 2021/0358032 A1 | 11/2021 | Cella |
| 2022/0269890 A1 | 8/2022 | Peleg et al. |
| 2022/0374635 A1 | 11/2022 | Xiong |
| 2022/0398396 A1 | 12/2022 | Xu |
| 2023/0222783 A1 | 7/2023 | Bowman |

OTHER PUBLICATIONS

Gan, et al., "Self-supervised multi-view multi-human association and tracking", MM '21, Oct. 20-24, 2021, Session 6 Emerging multimedia applications—II, Virtual Event, China.

Beddiar, et al., "Vision-based human activity recognition a survey", Multimedia Tools and Applications (2020), Springer.

\* cited by examiner

SYSTEMS AND METHODS FOR AUTOMATED ANALYSIS OF VIDEO STREAM DATA ACQUIRED AT A LOCATION FROM MULTIPLE IP VIDEO CAMERAS

CROSS REFERENCE TO RELATED APPLICATIONS

This application is a continuation-in-part of U.S. Utility patent application Ser. No. 18/376,610, filed Oct. 4, 2023, which claims priority to U.S. Provisional Application No. 63/417,935, filed Oct. 20, 2022. The disclosures of both of these applications are hereby incorporated in their entireties by this reference.

BACKGROUND

Video surveillance systems are ubiquitous in businesses today. Often, a business will install a plurality of cameras that collect video stream information from different areas within and around that business that may be of interest for monitoring for security, legal, or other reasons.

While analog video cameras may still be in use in some locations, in recent years, internet protocol ("IP") cameras have become a preferred camera type for surveillance. IP video cameras collect video stream data for transmission via ethernet cabling, Wi-Fi, or cellular networks to a central location for real-time review by a security guide or other person. Video multiplexers can process the individual video streams to allow a plurality of streams to be viewed on a single display in real time. The individual video feeds can also be engaged with a recording device if the need for historical review emerges.

Humans have limited ability to analyze multiple data streams simultaneously. It is well-recognized that a human cannot maintain a high degree of attention to a plurality of video streams for very long, typically about 20-30 minutes. This means that it is likely that a human reviewer of video stream information, whether done in real time online tracking or as a recording in offline tracking, may miss crucial information if they are reviewing multiple video streams. While some video stream processing methods available today can detect the presence of people and objects to provide alerts or to shorten the time it takes to find a relevant time/location in a subject video stream, human review is still likely needed to discern what actually occurred at the location that is being videoed. Practically speaking, acquired video stream data is typically only analyzed in detail today if a problem has been identified and a visual historical record of the source and content is needed. Such review will likely be by humans who may be required to review multiple video streams to identify the source of the recognized problem.

With the increasing proliferation of IP video cameras in businesses today, the ability to acquire data could be considered easier than it is to actually obtain actionable information from the collected video streams. The cost and operational simplicity of IP video cameras makes it fairly inexpensive to acquire a large quantity of video stream data. Nonetheless, review of the vast amount of data collected by these cameras remains a challenging process, as indicated. While it could be concluded that automated review of this data might mitigate the problem of their being more video stream data collected than there is human capability to review it, computer vision technology has not yet reached the point where this is widely possible. The ability to review the vast amount of data to generate insights that are actionable in the context of a business in which they are used to collect video stream information therefor significantly lags the speed that video stream data collection improvements are being introduced.

Even as more advanced video processing techniques might be developed to be allow automated detection of human or object activities that are videoed in a location, it is unlikely that such processing techniques could provide a full scope of useful information needed at a location where the IP video camera surveillance network is operational. IP video cameras installed for surveillance purposes at a business will typically be positioned during installation to allow acquisition of as much of a specific scene as relevant to a surveillance activity—for example, the entirety of a room. A technician installing IP video cameras for the purpose of surveillance will typically seek to reduce the number of cameras needed to obtain the widest field of vision, if only because the goal of camera use would be to acquire as much video stream data as possible from a single camera. If necessary, multiple cameras will often be installed in single room or location of interest to allow substantially all aspects of in the room to be videoed, however, the technician will still position these multiple cameras with a goal of reducing the overall number of individual video streams acquired at the location being surveilled. If overlap occurs between images acquired from multiple cameras present in a room or similar location, this is likely to be unplanned. When multiple rooms or different scenes are of interest for monitoring, one or more IP cameras may be installed to allow visualization of substantially all of the places at a business location that have been defined as relevant for video surveillance monitoring.

When competently installed, such existing IP video camera installations for the purpose of surveillance can usually provide good visual coverage of a business location which, of course, was the reason for their positioning in the first order. However, the camera orientations that enable good visual coverage do not necessarily enable collection of video stream data that can be processed to allow automated detection of human or object information acquired from a plurality of cameras. Such video stream data may not incorporate the information necessary to both detect and recognize a human, object, or human/object activity that is occurring at the location.

Human activity recognition is an emerging field of computer vision. It can be useful to not only detect that a human is present in acquired video stream data but also be able to detect what the person may be doing. Of course, it can be difficult for an actual person to detect what another person is doing in real life when they are present with the other person; it follows that it can be even more difficult to train a computer to conduct this type of analysis. In many situations, a human action of interest for monitoring may occur over a period of time and over distances for which an entirety of the human activity can only be captured over several surveillance cameras installed at different locations. As noted, these several surveillance cameras are unlikely to be installed in the first order with a goal of generating the type of image data that can be processed using existing computer vision methodology to extract useful information therefrom. To this end, video imagery collected from multiple surveillance cameras can be expected to not comprise a suitable overlap to allow video stream data from the cameras to be used to generate accurate information associated with activities that are occurring where the cameras are installed. Furthermore, multiple images captured from different cameras can have different illuminations, include occlusions, and orient a subject object(s) in different positions/poses. Such issues can make it virtually impossible to use images derived from legacy IP surveillance camera installations for human activity recognition, among other things.

One location where human activity recognition can be relevant is a business location where a single customer activity might occur over a plurality of locations where different IP cameras may be installed. A car dealership is an example of such a business location. As would be appreciated by anyone who has ever visited a car dealership for a purpose of shopping for a car, buying a car, or seeking service for their automobile, would appreciate the various steps or activities that are typically part of each customer experience. Often, these steps or activities involve the actions of several persons, each with their own roles and responsibilities that collectively make up the overall customer process. If any of these steps or activities are not properly conducted, at best, the overall process can take significantly longer than it needs to or, at worst, the customer can become frustrated and terminate the transaction to the that sale does not happen.

To illustrate one of the several complex processes that commonly occur at a car dealership, when a car is brought into a car dealership for service, multiple steps or activities must be conducted in order for that service event to be appropriately started. Notably, these steps will initially involve an object (i.e., the car), a customer, and at least one service advisor who interacts with the customer. In order for the service event to be successfully completed, the service personnel must repair or service whatever elements of the automobile are relevant to the service event, the service advisor must maintain appropriate contact with both the service team and the customer. Often, the customer may decide to wait at the dealership while the service of their automobile is being conducted, and it can be relevant to make sure that any waiting room amenities (e.g., coffee supplies, television, internet access, bathrooms, etc.) are in good working order so that the customer can be comfortable while waiting. In notable circumstances, the time that a customer waits during service can also become an opportunity for them to begin the early stages of shopping for a new car, which could transform the service event into a shopping event associated with the same customer. With such a complex set of activities, it can be realized that without proper management among and between each of these steps or activities, customer satisfaction associated with their visit may suffer.

Significantly, car dealerships are locations that are typically populated by multiple IP cameras installed primarily for security reasons. However, for the reasons discussed above, such cameras cannot be used to monitor the several events that need to occur when a customer is visiting a car dealership for a potential or actual vehicle purchase event or a service event, or for any other purpose. Accordingly, there remains a need for improvements in the ability to utilize IP security cameras installed in a car dealership to automatically analyze steps or activities associated with a customer-related event to better ensure that the event is appropriately completed so that customer satisfaction can be enhanced.

Additionally, other types of businesses have needs of tracking the activity of humans (e.g., employees and customers, etc.) and objects (e.g., cars, products, supplies, etc.). For example, many restaurants today earn substantial revenue from customer pickup. While many of these restaurants require the customer to park and enter the restaurant to get their food orders. Often the customer may need to wait for their presence to be acknowledged and for a busy restaurant employee to manage delivery of their order. In some cases, a customer's order may be removed from the kitchen when it is completed, but the customer may not yet have entered the restaurant to retrieve it. The effort required for a customer in picking up their order and the possibility the food quality may suffer due to a lack of coordination between the kitchen and customer delivery may reduce customer satisfaction.

Like a car dealership, a restaurant parking lot is likely to be populated by multiple IP video cameras installed primarily for security reasons. It would be beneficial for such existing cameras to be leveraged to enhance the customer food pickup experience at restaurants. More broadly, the ubiquitousness of multiple IP video cameras used for surveillance at locations today for surveillance or monitoring purposes could provide previously unrealized value for business owners if these camera networks could be configured to address specific problems relevant to the subject location, such as a business. For example, a business needing to track objects and people in a particular environment for a specific business purpose could benefit if their existing IP video camera network could be operational to conduct such tracking as needed by that business. The present disclosure provides these and other benefits.

SUMMARY OF THE DISCLOSURE

Various aspects of the present disclosure are related to identifying and monitoring an event of interest at a location, such as a business. In one aspect, among others, a method for identifying and monitoring an event of interest via an internet protocol video camera network installed at a location comprises providing the internet protocol ("IP") video camera network operational at the location, wherein the IP video camera network comprises a plurality of passive IP enabled video cameras each installed at a plurality of different areas at the location, and wherein each of the plurality of passive IP enabled video cameras are: in communications engagement with a graphics processing ("GPU") server operational with a visual artificial intelligence engine; and configured with a first field of view ("FOV") at a first time, thereby generating expected scene information for each camera; determining at a second time whether there has been a substantial change in the first FOV for any of the plurality of passive IP enabled video cameras in the IP video camera network and, if a change in the first FOV for a camera has substantially changed from the first time to the second time, adjusting the camera's FOV to substantially align with the camera's first FOV; detecting an event of interest for monitoring at the location, wherein the event of interest is associated with the activity of one or more humans at the location, and wherein the event of interest is detected by: acquiring video stream information comprising at least two video streams, wherein each video stream is derived from a different video camera in the IP video camera network; transmitting the video stream information to the GPU server; and processing the video stream information via the visual artificial intelligence engine; acquiring additional video stream information associated with the detected event of interest from the second time to a subsequent time; transmitting the additional video stream information to the GPU server; processing the additional video stream information via the visual artificial intelligence engine; generating information associated with the detected event of interest; and configuring the generated information for use in one or more of: a report or a dashboard for use by an owner or manager of the location; a notification to one or more persons associated with the event of interest; or subsequent event detection processes.

In one or more aspects, a change in a camera's FOV can be detected from the first time to the second time and a notification can be provided to a user; and the user can be provided with instructions to adjust the camera's FOV to substantially align with the camera's first FOV. A change in a camera's FOV can be detected from the first time to the second time and a notification can be provided to a user; and the system can be configured to adjust the camera's FOV to substantially align with the camera's first FOV. The determination of a change in a first camera's FOV from the first time to the second time can comprise: selecting a FOV for the first camera positioned to acquire imaging information for a scene; selecting one or more reference elements present in the scene at a first time from acquired imaging information; processing the acquired imaging information to generate location information for the one or more reference elements at the first time; acquiring imaging information of the scene from the first camera at the second time; processing the acquired imaging information to generate location information for the one or more reference elements at the second time; comparing the location information for the one or more reference elements at the first time and the second time; and determining whether the location information for the one or more reference elements has changed from the first time to the second time. The acquired image information processing can comprise each of: decomposing the one or more reference elements into polygons; locating each of the polygons in the scene at the first and second times; and calculating a change in a location for each of the polygons from the first time to the second time. A confidence level can be generated for each calculated change in a polygon location; and a FOV adjustment can be made to each camera for which a generated confidence level exceeds a predetermined confidence level. The acquired image processing can further include generating classifications for the one or more reference elements.

In various aspects, the visual artificial intelligence engine can be configured to generate a single synthetic video stream associated with the event of interest from the at least two video streams. The visual artificial intelligence engine can comprise a plurality of individual visual artificial intelligence models configured to recognize either or both of human or object activity associated with the event of interest. Each of the plurality of individual visual artificial intelligence models can be selected from a visual artificial intelligence model library operational with the GPU server. The event of interest can be detected by recognition of either or both of human-related or object-related activity. The recognition can be from human-related activity, and the activity can comprise movement of one or more body parts of a human visible in the video stream information. The human-related activity can be detected without use of a sensor associated with the human. The recognition can be from object-related activity, and the object-related activity can comprise movement of one or more objects visible in the video stream information. In some aspects, the object-related activity is not detected from sensors associated with the object. In one or more aspects, the plurality of passive IP enabled video cameras are not configured to generate overlapping imagery. The event of interest can be monitored for a period of time after detection, and wherein the monitoring can comprise recognition of either or both of additional human-related or object-related activity. The method can further comprise determining an end point for the event of interest, wherein the end point can be determined from recognition of either or both of human-related or object-related activity. The site can comprise a car dealership and the event of interest can comprise: a prospective or actual purchase of a vehicle by a customer visiting the car dealership; or servicing or repair of a vehicle present at the car dealership. The site can comprise a parking location associated with a restaurant and the event of interest can comprise a pickup of a food order from the restaurant.

The identified embodiments and aspects are exemplary only and are therefore non-limiting. The details of one or more non-limiting embodiments of the disclosure are set forth in the accompanying drawings and the descriptions below. Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

DETAILED DESCRIPTION OF THE DISCLOSURE

Figure 1:
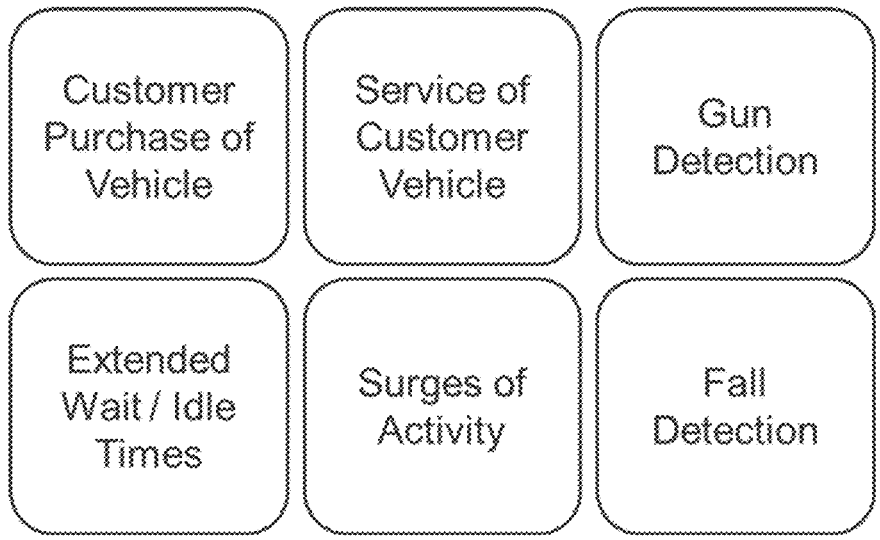
FIG. 1 illustrates examples of top level processes, in accordance with various embodiments of the present disclosure. Top Level Processes include the highest level of event recognition that describe or account for a series of events or processes that involve employees or customers. Top level processes can be defined as a sequence of chained events that comprise lower-level event recognition models and algorithms, which can be termed "sub-level processes."

In the following detailed description, reference is made to the accompanying drawings, which form a part hereof, and within which are shown by way of illustration certain embodiments by which the subject matter of this disclosure may be practiced. It is to be understood that other embodiments may be utilized, and structural changes may be made without departing from the scope of the disclosure. In other words, illustrative embodiments and aspects are described below. But it will of course be appreciated that in the development of any such actual embodiment, numerous implementation-specific decisions must be made to achieve the developers' specific goals, such as compliance with system-related and business-related constraints, which may vary from one implementation to another. Moreover, it will be appreciated that such development effort might be complex and time-consuming but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. If there is a plurality of definitions for a term herein, those in this section prevail unless stated otherwise.

Wherever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and is also interpreted not to exclude additional features, limitations, aspects, etc.

The term "consisting essentially of" is meant to exclude any features that would change the basic and novel characteristics of the present disclosure, as claimed.

The term "about" is meant to account for variations due to experimental error. All measurements or numbers are implicitly understood to be modified by the word about, even if the measurement or number is not explicitly modified by the word about.

The term "substantially" (or alternatively "effectively") is meant to permit deviations from the descriptive term that do not negatively impact the intended purpose. Descriptive terms are implicitly understood to be modified by the word substantially, even if the term is not explicitly modified by the word substantially.

"Vehicle dealership" or a "car dealership" or "automobile dealership" means any business establishment which sells, leases, and or services/repairs new or used automobiles, trucks, vans, trailers, recreational vehicles, boats or motorcycles or other similar motorized transportation vehicles. Such a dealership may maintain an inventory of the vehicles for sale or lease and may provide services including facilities for the preparation, washing, repair and service of such vehicles. As used herein, the terms "vehicle dealership," "car dealership," and "automobile dealership" can be used interchangeably unless the context indicates otherwise.

Hardware configured with video analytics capability can comprise a server-side graphics processing unit ("GPU") configured to handle high-throughput real-time video stream processing generated from the plurality of IP cameras so as to accelerate AI-based video analytics according to the methodology herein. Hardware useful herein can incorporate one or more GPUs (e.g., NVIDIA, AMD, etc.) that have been specifically optimized for deep learning tasks. As would be appreciated, a GPU handles the computationally intensive tasks of processing video frames and running neural network models to identify information from visual data in real-time.

The hardware configured with video analytics capability is referred to hereinafter as a "GPU server." As would be appreciated, GPU servers are specifically designed to handle complex computational and data processing tasks. The key components of a typical GPU server include:

- GPU: The core of a GPU server is its Graphics Processing Unit, which excels at parallel processing.
- CPU: The CPU plays a crucial role in managing system resources and executing code that is not optimized for GPU processing.
- Memory: Adequate memory capacity is essential for the smooth running of intensive tasks such as neural network training. When evaluating a GPU server, both RAM (random access memory) and VRAM (video memory) are considerations to ensure optimal performance.
- Storage: Fast storage solutions like NVMe SSDs are common in GPU servers, helping to minimize bottlenecks caused by slow data access speeds during compute-intensive processes.

An "Internet Protocol (IP) Video Camera," is a type of digital camera that receives and sends video footage via an IP network. Each video camera will be configured with its own IP address, which enables identification of a source of video stream data that is utilized herein. IP video cameras are generally configurable to compress video files and automatically transmit them as needed for a specific process. IP video cameras can be connected to system-relevant hardware via ethernet cable with a broadband modem or router, or wirelessly via a Wi-Fi router. In some configurations, acquired video stream data can be transmitted via a cellular network. An IP video camera can capture footage in high definition-resolution can be as high as 16 megapixels, depending on the camera model. The IP video cameras operational herein can be configured with Real Time Streaming Protocol (RTSP), where RTSP is an application-level network communication system that transfers real-time data from multimedia to an endpoint device by communicating directly with a server streaming the data.

An "IP video camera network" as used herein comprises a plurality of IP video cameras installed in a location of interest for monitoring for human and/or object-related activities therein. In the context of the IP video camera network herein, these installed IP video cameras can be configured to be in communications engagement with a GPU server and other relevant hardware. The IP video network can also comprise a cloud computing environment in communications engagement with the visual analytics processing capability. The IP video network operational in a cloud computing environment is configurable to provide various functionality within and among the hardware operational in the system and processes herein. Such functionality includes, for example, incorporation of various components of a visual AI library on an as-needed basis, as discussed further herein. Cloud computing operability can also allow storage of acquired video streams, distribute visual AI models to a GPU server installed at a location, manage software licenses, assist in operation of an IP video camera network at an installation location, and as a gateway to provide owners or managers of the IP video network with notifications associated with detected activities occurring in the location.

In accordance with the processes herein, the plurality of IP video cameras—a/k/a the IP video camera network—are in communications engagement with hardware configured with video analytics capability to enable analysis of each frame of video generated from a specific location of interest. Such specific location of interest can comprise a single room where a plurality of IP video cameras are located. This specific location or area can also comprise a plurality of rooms in which a plurality of IP video cameras are individually located, where each of the rooms can have one or more IP video cameras therein. Still further, the specific location or area can be associated with a workflow that is relevant to one or more activities of a human and/or an object, where a plurality of IP video cameras are located in one or more areas associated with such activities.

"Visual artificial intelligence," (a/k/a "visual AI") is an aspect of computer science that teaches machines to make sense of images and visual data the same way people do. Visual AI is directed to enabling machines not just to see, but to also understand and derive meaning behind images and video in accordance with one or more algorithms configured for such functionality.

A "visual artificial intelligence (AI) engine" as used herein comprises systems and processes to analyze acquired video stream information via a collection of visual AI models configured to identify humans and/or objects therein, as well as to detect activities of interest associated therewith. The visual AI engine can comprise a real-time human and/or object activity detection engine, where such capabilities are operational via functionality operational on a GPU server. The visual AI engine can also include or can be in communications engagement with a cloud visual AI library incorporating a collection of visual AI models that are available for selection and deployment in an IP video camera network. To this end, the visual AI models operational to detect human and/or object-related activity in accordance with the disclosure can be selected by an owner or manager of a location of interest for monitoring or tracking etc. of one or more events, as is discussed in more detail herein. Such visual AI models can also be provided as a collection defined as relevant to a particular business type, again as discussed further herein.

In significant implementations, the visual AI engine comprising a collection of visual AI models relevant to or associated with a vehicle dealership is operational on the GPU server. In this regard, each of the IP video cameras installed at different locations at a vehicle dealership can transmit acquired video stream data to a GPU server in communications engagement therewith for recognition and, optionally, identification of human and/or object activities.

In some implementations, the plurality of IP video cameras can be installed in different rooms, areas, or locations at the vehicle dealership. In further implementations, a plurality of IP video cameras can be installed in a single room, area or location at the vehicle dealership, where the individual cameras were not originally installed so as to generate overlapping imagery from which prior art computer vision algorithms can suitably be used to derive object and human activity information therefrom.

The disclosure herein provides systems and methods for automatically monitoring or tracking one or more events of interest via an IP video camera network at a vehicle dealership. The video stream data processing by the GPU server includes analysis of the acquired video stream data acquired from a plurality of IP video cameras installed in different rooms, areas, or locations to identify an event of interest for detection, as well as an association of a time therewith. Such identified events that can occur at a location of interest can be expansive, and a variety of examples are provided herein. Video stream data can be acquired for an identified event from at least two IP video cameras in operational engagement with an IP camera network installed at the location of interest. The identified event of interest for monitoring can be associated with one or a collection of human and/or object-related activities that are defined as relevant to an event of interest.

"Human activity recognition" as used herein comprises both the monitoring or tracking of actions performed by humans from video stream data generated at a location, such as a car dealership or other locations, where the IP video camera network has previously been installed. Such steps of detection and recognition can collectively be referred to as "recognition" when used in the context of the disclosure herein. The human activities that can be recognized according to the methodologies herein can be associated with or relevant to an event of interest for detection in which the IP video network is operational. In accordance with the systems and methods herein, "human activity" can refer to the way or ways someone moves their body, either as individual movements or collection of movements by one or more body parts. The human activities of interest for recognition herein can generally be associated with actions that are known or expected to be substantially uniform or aligned between and among different people so that the human activity of interest for recognition can be detected and identified in many, if not most or even all, of the people who might perform that activity as visible in acquired video stream data.

In various implementations, human activity recognition from acquired video stream data generated from a plurality of IP video cameras installed in a scene or location of interest can be substantially independent of the identity of a person who performs that activity. For example, an activity recognized or identified to be a greeting of a person by another person can be identified between and among different customers, employees, time periods, locations, etc.

In some aspects, a human activity defined as relevant to an event of interest for detection at a location of interest from video stream data acquired from a plurality of IP cameras can involve or be associated with two or more people. For example, two people can be detected in acquired video stream data and the movement of those people toward each other can be derived from changes in their positioning in the video stream data as a function of time. When this movement slows and then stops with the people detected as facing each other, the system can recognize a human action of two people approaching each other to generate a greeting or other similar characterization that might be relevant to an event of interest for detection at the location of interest. If one of the two people is known by the system to be an employee and the other person is a person who enters a location but whose identity is not known to the system, the event of interest for recognition could be identified as that of a customer entering the dealership and the human activity of interest for recognition can be the greeting of that customer by the employee when the customer first enters the dealership lobby. An associated parameter of interest for determination along with that event can be a time that it takes the employee to greet the customer when she enters the location. Put another way, a detected event or activity of interest can also be associated with a relevant time that it took for that event to be started in the first order. As discussed herein, such event identification, human activity recognition, and associated parameter assessment can be derived from processing of the acquired video stream data via the visual AI engine associated with the IP video camera network.

As would be appreciated, the video stream data analysis, which can be fully automated in some implementations, of acquired video stream data typically includes each of the following components:

Localization: An object is detected in a video frame image, for example, by the drawing of a bounding box around something detected as an object.

Object Detection: The object is located and categorized in a video frame image.

Image classification: The category of a video frame image is determined from among a set of predefined categories (e.g., car, person, horse, scissors, statue).

Object identification: Given a target object, all of its instances in a video frame image are identified (e.g., find all persons in an image).

Object tracking: The identified object(s) are followed over time in a video.

In the context of the present disclosure, the recognition and, optionally, identification of object activity from video stream data acquired according to the methodology herein can comprise recognizing and, optionally, identifying an object present in the video stream data coupled with the monitoring or tracking of differences in location, positioning, etc. of the object in subsequent video image frames. The visual AI engine operational in the systems and methods herein can be configured to recognize and, optionally, identify objects of interest from the video stream data and to analyze how such objects may be moving or changing position in subsequent video frames. Such movement or positioning changes can be associated with information pertinent to the context of the location—for example, a car dealership—having events or activities of interest that occur therein. The systems and methods herein can allow context-based information about objects moving in and around one or more rooms, areas, or locations at a location of interest to be determined, thereby allowing actionable insights about what is happening at the dealership to be partially or fully derived from video stream data generated from a plurality of IP video cameras using the visual AI engine herein.

Activity recognition for a human and/or an object can be characterized as a more complex operation than either human or object detection by itself at least because not only is a "thing"—that is, a human or an object—being detected in acquired video stream data, but the "what" is being done vis a vis that human or object in the video stream data is also being discerned. The addition of context relevant to a location of interest from which the video stream data is being acquired from a plurality of IP video camera is thus a significant aspect of obtaining actionable insights relevant to a subject location using the automated visual AI systems and methods disclosed herein, and the systems and methods herein provide heretofore unrealized benefits in this regard.

With regard to humans specifically, recognition of human activity of interest from IP video camera imaging information derived from a plurality of cameras could be considered to be a more difficult technical problem than of object detection at least because there is likely to be more variability associated with human activity. That is, humans will present in a scene or location—for example, a car dealership—with different sizes, shapes, clothing, etc. They can also present with different ways to perform the same activities (e.g., a greeting as a handshake vs. a greeting with an elbow bump). It follows that the visual AI engine configured to detect human activity from video stream data acquired from a plurality of cameras should be configured to not only to accurately detect and identify each human who is present in acquired video stream data, but also to accurately recognize and identify the activities that each human is performing during an event of interest, where such recognized human activities are defined as being relevant to or associated with that event.

Human activity recognition from video stream data acquired from a plurality of IP video cameras generally comprises at least three components: 1) video frame segmentation; 2) action representation with respect to posture and motion of a human body detected as being present in the video frame(s); and 3) machine learning processes that are configured to recognize actions as conforming or aligning to a human activity of interest in context.

An insight of the inventors herein is that while humans and objects may be associated with a large number of "activities" that can be detected from acquired video stream data derived from IP video camera installed at a location of interest, only some of these activities might be identified as relevant to or associated with an event of interest for monitoring at the dealership at which the video stream data is acquired. In this regard, an owner or manager of a location where an IP video network is operational may be interested in monitoring or tracking whether an employee is conducting their job duties in accordance with training or compliance obligations. Such activities are typically associated with procedures that can be represented as a workflow. In turn, these workflows can serve as a framework for recognizing starting and ending points of events relevant to the location, as well as recognizing the activities of humans and objects relevant to or associated with those events.

Unlike prior art visual AI systems, the methodology herein does not generate a comprehensive training model that evaluates an entire process to use the actions therein as a template for generation of training data that is used in subsequent human activity detection scenarios. In other words, the processes herein are operational without use of pre-trained models. Instead, the methodology herein utilizes a plurality of individual visual AI models derived from discrete identified activities that have utility when provided as a collection of human and/or object activity information that can be used to evaluate a video stream associated with an event of interest, where the event can comprise a plurality of individual activities capable of monitoring or tracking. By reducing a larger event of interest into individual steps, or activities, that collectively can comprise an event of interest for detection many individual visual AI models can be redeployed for use to detect different activities that may be of interest for detecting and identification at a location where the IP video camera network is operational. Moreover, human and/or object activities that may be of interest for detection can be identified organically from video stream information. The inventors have determined that such reduction of a larger event into smaller steps or activities can simplify development of visual AI detection processes and, as such, model development complexity can be enhanced without the need for generation of a large set of pre-trained models.

In notable implementations, the human activity recognition can be characterized as a "vision-based" and not "sensor-based." As the name suggests, vision-based recognition technique utilize one or more cameras for collecting video samples of human activities whereas sensor-based recognition utilizes sensors from mobile devices or body attachments.

Yet further, the methodology herein does not require that the humans and/or objects for which activities are being detected have been pre-identified or pre-marked. In this regard, a human does not have to be associated with a sensor (e.g., a RFID-enabled badge, known cellular phone, etc.) in order for their activities to be recognized, tracked, etc. For objects, such as vehicles present in a car dealership, there is no need for the object to be marked with RFID, QR code, BLE beacon, etc., in order for the activity of the object to be recognized, tracked etc. in an area or location.

The human and/or object-related activities can be recognized and, optionally, identified so that such activities can be monitored or tracked from the video stream data in relation to an event of interest at the location.

The present disclosure further provides a heretofore unrealized method to fuse a plurality of video streams generated from a plurality of IP cameras present at a location where the IP video camera network is operational, wherein each of the video streams can be processed via functionality operational with a GPU server to generate a synthetic video stream derived from a plurality of IP video camera streams. The synthetic video stream is therefore associated with an event of interest for monitoring or tracking at the location where the IP video camera network is operational. By "synthetic video stream" it is meant that a new video stream associated with an event can be generated from processing of the plurality of video streams derived from each of the IP video cameras in the IP video camera network. The plurality of video streams processed to generate the synthetic video stream for the event can further be processed to comprise the same timestamps, thereby providing a plurality of video streams generated from different cameras that are time synchronized. This, in turn, can provide a substantially continuous single synthetically generated video feed associated with an event of interest for monitoring or tracking in a location of interest, for example a car dealership or other location where human and/or object-related activity monitoring or tracking may be relevant.

In significant implementations, the methodology herein can enable information about an event of interest to be derived from the plurality of existing IP video cameras even though these cameras may not be natively configured for collection of video stream data from which recognition or identification of humans and/or objects and associated activities of interest as an intended outcome. In other words, synthetic video stream data can be generated by automated analysis of a plurality of individual video streams collected from a plurality of cameras operational in a location of interest (e.g., a car dealership, etc.) to generate a synthetic video stream associated with an event of interest for detection and analysis at the location. In various implementations, a plurality of IP cameras from which video stream data is generated that is associated with a human and/or object-related activity of interest are not configured to generate overlapping imagery in which all or part of the human and/or object is present in the overlapping portion thereof.

As noted, human activity recognition from video stream data is a technically complex operation and, to date, minimal progress has been made in accurately recognizing activities "in the wild," that is, in scenes or locations that are associated with a large number of unknown variables or parameters. A further insight of the inventors herein is that, in many scenes or locations from which video stream data can be acquired, human activities that are of interest for monitoring can be classified according to defined processes and subprocesses that may be relevant to or associated with business or other operations that may be of interest at the subject location. In this regard, the present disclosure provides improvements to existing visual AI methods by realizing that it may be necessary to recognize only some human and/or object-related activities from a larger set of activities that may also be occurring in a scene or location in order for valuable business process and other insights to be derivable from generated video stream data, such as those described herein.

A further improvement of the disclosure herein is a recognition by the inventors herein that many human and/or object-related activities that may be relevant for recognition via visual AI methodologies may be common to many different events that may be of interest for monitoring or tracking in different locations or situations. The ability to accurately identify a collection of human and/or object-related activities that may individually or collectively have relevance in different locations or situations has been found by the inventors herein to generate more efficient visual AI engine development.

In this regard, the disclosure further includes a visual AI software library comprising a plurality of selectable visual AI models that can be deployed on an as-needed basis at different locations having need thereof. The visual AI software library and the contents associated therewith can provide an owner or manager of a location in which video stream data is acquired via an IP camera network with an ability to detect a number of human and/or object-related activities at that location as pertinent to one or more business or other use cases or scenarios.

The selectability of human and/or object-related activities for detection via selection of one or more visual AI models available in the visual AI library for deployment in a visual AI engine operational on the IP video camera network can provide a previously unavailable ease of use of sophisticated computer vision monitoring or tracking technology for use by non-expert operators. In short, the systems and methods can be characterized as a type of "plug and play" visual AI system for which an owner or manager having little, if any, computer vision and software development expertise can operate "out of the box." The systems and methods herein can therefore be expected to accelerate the adoption of visual AI methodology in business processes.

Still further, as configured, the systems and methods herein can allow legacy/existing IP video camera systems installed for the purpose of surveillance to be used. As used herein, "legacy/existing IP video cameras" means that at least one, and typically a plurality of, IP video cameras have previously been installed in a location where the IP video camera network is operational. Specifically, these legacy/existing IP video camera installations installed at a location have previously been configured to generate video stream data suitable for real time and after the fact review associated with surveillance of the location, and not for generating overlapping imagery. In some implementations, the systems and methods herein can therefore be considered to be "IP video camera agnostic" such that substantially all types (e.g., models, brands, etc.) of legacy/existing IP cameras can suitably be used with the methodology herein as long as they are capable of transmitting a suitable video feed to the GPU server operational with the IP video camera network.

The ability to overlay the visual AI methodologies herein onto older camera systems and/or camera systems that were not positioned during installation to generate overlapping image information from multiple cameras can be expected increase the flexibility and accessibility of the disclosure herein at least because new cameras do not need to be purchased, installed, and configured in order for the advanced video analytics activity monitoring or tracking methodologies herein to be used. As would be appreciated, many, if not most, businesses today have installed IP video cameras for the purposes of surveilling a location for safety, compliance, training, or any number of other reasons. While such cameras will typically comprise IP video cameras, unless they are of a very new vintage, already-installed surveillance cameras will not typically include video analytics capabilities operational thereon. Such legacy/existing camera systems were likely expensive to install in the first order and may still have considerable useful life remaining. Owners or managers of a location where such legacy/existing IP video cameras are currently installed may thus be reticent to replace them so that they can acquire video analytics capabilities in their businesses etc. By being useable with such legacy/existing IP video camera systems, the cost and complexity of adoption of visual AI methodologies by those businesses that already own a legacy/existing IP video camera system can be greatly reduced according to the disclosure herein.

In significant implementations, the activities of interest for monitoring and tracking can be provided to an owner or manager of a location where the event of interest occurs via selection from a pre-populated library of visual AI human and/or object activity models. In this regard, the owner or manager can review the visual AI library to identify a plurality of human and/or object-related activities that are of interest for tracking in the context of their own processes, location, etc. For example, the owner or manager of a car dealership can select from a provided list of human and/or object-related activities that may be of interest for monitoring or tracking at the location. Visual AI model information can then be made operational at the location, such as by downloading to a local computer network, to allow the activities of interest to be detected and identified therein to be analyzed via the GPU server and associated components. The owner or manager thus does not need to hire personnel with data science, computer vision, and other high-level skills that are typically associated with visual AI processes in order to be able to obtain useful information from the video streams acquired at the location where the human and/or object-related activities may be relevant to an event of interest for monitoring or tracking at a location.

Moreover, the ability to select only those activities that are of interest in the context of a particular business or business activity can reduce the operational complexity normally associated with adoption of artificial intelligence processes. When combined with the ability of a location where the IP video camera network is operational to use existing IP camera setups, the adoption of visual AI processes for implementation of useful processes can be expected to be enhanced.

In implementations, the systems and methods herein can transform legacy/existing IP video camera installations that are currently used for passive video monitoring into active video monitoring. By "active video monitoring," it is meant that real time notification associated with one or more activities of interest can be provided when human or object-related activities are detected in video stream data generated at the location. Such real-time notifications can be automatically provided by the computer. Such active video monitoring can be enabled by an ability to generate real time notifications to an owner or manager of a location on or any other person having an interest in knowing whether one or more activities associated with or relevant to an event being monitored or tracked at a location are occurring (or not occurring) in the manner defined according to a pre-determined workflow, timing, etc.

The IP video camera network can be in communications engagement with an automated notification engine operational to provide real time notifications when the system has been configured to detect a human and/or object-related activity via one or more visual AI models. Owners or managers of an IP video camera network installed at a location can obtain real time notifications via a mobile app configured to receive notifications. An IP video camera network can also be operated from a mobile app, including adjusting settings, selecting, or deselecting visual AI models for deployment on the network, and reviewing historical information such as past events and report viewing. The notifications can also be stored for later review, presented to a user as a collection of information presented in a dashboard configuration, and/or as information used in to modify or improve the visual AI models for subsequent use thereof.

A system operational in a location, such as a car dealership, can be configured with a "setup wizard" that can automatically configure the IP video cameras to communicate with the GPU server and with other components or features that can provide the system functionality. In this regard, the system can be configurable to automatically identify the IP addresses, resolutions, technical specifications etc. of a plurality of IP video cameras present at the location where the IP video camera network is operational where the event(s) of interest are to be monitored.

Componentry operational with the GPU server can also operate as a gateway to manage the operation of the individual IP video cameras operational within the IP video camera network. While an individual IP video camera can be managed independently of the others operational in the network, in various implementations, this may not be an optimum state when the cameras are installed as a network comprising a plurality of individual IP video cameras at least because the system can operate to improve the operation of the IP video camera network over time. For example, the system can include functionality that evaluates operation of each individual IP video camera and the effect thereof on acquired video stream quality. If the componentry operational at a location determines that illumination of an individual IP video camera can be adjusted to generate a better overall video stream in the context of a collection of acquired video streams processed according to the methodology herein, the system can make an adjustment thereto. Such operation and associated learning can be uploaded to the cloud computing environment for use in other visual AI processes.

In various implementations, the human and/or object-related activity recognition capabilities of the present disclosure can be configured for a specific activity of interest by recognition and, optionally, identification of that activity in one or more video streams acquired at the location in which the IP video network has been configured. The visual AI engine can be configured to detect and identify a specific human and/or object-related activity of interest from the acquired video stream data from recognition and, optionally, identification via analysis of motion associated with one or more humans and/or objects over a plurality of video frames. Such human and/or object-related activity recognition and, optionally, identification can be enabled by configuring the visual AI engine with information associated with one or more activities relevant to the event of interest for tracking at the location. Such information can be provided by one or more visual AI models derived from the visual AI library discussed herein.

The systems and methods herein can be configurable to operate on an existing IP camera network that has been time-synchronized to generate a common time. The generation of a common time among and across a plurality of IP video cameras can allow an event of interest to be monitored or tracked at the location where the IP video camera network is operational and the presence (or absence) of one or more pre-defined human and/or object-related activities associated with the event to be detected and identified. The common time can be generated by or otherwise derived from the GPU server in communications engagement with the plurality of IP video cameras. For example, the GPU server can be configured to push a common time defined by the GPU server to all of the cameras to reset the time thereon. Alternatively, the GPU server can be configured to generate a single time for each video feed upon receipt thereof from the individual video cameras irrespective of the time generated for each video stream by the camera from which the feed was generated. Such common time can be assigned to each of the individual video stream data acquired from a plurality of IP cameras operational at a location, and any generated video stream derived from a plurality of video cameras can be configured with that common time. Other time synchronization methods can also be contemplated. In significant implementations, any time information generated from multiple IP video cameras operational in an IP video network installed in a location are substantially identical between and among video stream data derived from each of the individual cameras.

One or more IP video cameras can be configured to acquire video stream information associated with an event of interest for monitoring or tracking at a location. The one or more IP video cameras can be configured in a single place (e.g., room, department, etc.) to collect a single video stream for detection of one or more human and/or object-related activities that are associated with or relevant to an event. Once an activity of interest is detected from acquired video stream data by processing thereof on the GPU server, a start time for the event can be generated therefore.

Additional video stream data associated with or relevant to an event of interest for monitoring or tracking at a location can be acquired and processed by an GPU server in communications engagement with a plurality of IP cameras configured in an IP camera network having one or more visual AI models operational thereon. This can allow one or more human and/or object-related activities to be defined as being associated with or relevant to that event being monitored or tracked over a duration of the event. In notable implementations, the event monitoring or tracking via processing of acquired video stream information on the GPU server can allow determination of whether or not one or more pre-defined human and/or object activities associated with or relevant to the event of interest in fact occurred. In some implementations, the completeness of, performance quality, etc. can also be assessed.

An ending time can also be generated for an event of interest, where the ending time can be generated from recognition and, optionally, identification of one or more human and/or object-related activities defined being associated with a signal of an end point of the event of interest that is being monitored or tracked at the location. In some cases, an ending of an event may not be readily detectable from the acquired video stream data via processing associated with the GPU server. Information associated with an absence of an end point to a previously identified event can nonetheless be of interest, also. In this regard, if an ending of an event is not detected, a workflow associated with the activity detection may need to be adjusted and/or a reason that the event ending was not detected by processing of acquired video stream data may need to be discerned.

When an event of interest is detected from human-related activity observable from IP video camera data obtained from a location, a human associated with the event can be identified as a customer or visitor to the location in which the IP video network is configured. Yet further, an identified human can be recognized as an employee or a representative of the location.

A collection of activities relevant to or associated with an event of interest for monitoring or tracking via acquired video stream information can be defined for a specific business activity or for any other purpose. Visual AI models associated with these activities can be selected from a visual AI library for use in a specific implementation. A workflow associated with or relevant to one or more activities of interest can be suggested to the owner or manager of a location in which the IP video network is operational or he can select activities via a workflow that is specific to the location. In other words, a standardized set of human and/or object-related activities can be pre-configured for detection from acquired video stream information at a location or a customized set of human and/or object-related activities can be defined for the location by an owner or manager thereof. The selected visual AI models can then be operational on the visual AI engine deployable at that location.

Once the event of interest for monitoring or tracking is selected and monitoring thereof starts at the location, video stream information can be acquired for that event during a duration thereof. Recognition and, optionally, identification of human and/or object-related activities associated with or relevant to the event can then be evaluated via the visual AI engine on which a plurality of visual AI models are operational and information about the event can be automatically derived therefrom. As would be appreciated, many events that are of interest for monitoring or tracking at a location can comprise multiple embedded activities. It follows that some activity detections may be expected to be complex operations. However, the inventors herein have recognized that even very complex events can be broken down into a plurality of less complex, more manageable activities, thus further enhancing the usefulness of the methodology herein.

In a notable implementation, the systems and methods are able to match or align one or more human and/or object-related activities present in video stream data generated from two or more video cameras via processing via the GPU server. In this regard, the GPU server can be configured to process information about a single event of interest having various activities associated therewith that can be recognized in a plurality of video streams generated from multiple IP video cameras. The GPU server operational in the IP video network of the present disclosure can be configured to automatically detect and identify human and/or object-related activity associated with or relevant to an event being monitored or tracked and to associate such recognized activities with that event being tracked.

In one aspect, an event defined as being of interest for monitoring or tracking at a location can be recognized by a first detection of a human at the location. That detected person can be identified via generating a unique identification that is durable across the timespan of the event being tracked. If the visual AI model detects a human associated with a unique identification and for which an event of interest has not been created, an event associated with that person can be initiated and human and/or object-related activities associated with that event can be monitored over the course of that event.

Once a human not having a known identity is detected at the location, one or more features or characteristics associated with that person can be matched or linked to that person to generate a unique identification for that person. Such unique identification can be used to generate reidentification of that person when they move in and around the location and are visible in different video streams acquired from different video cameras. Identification and reidentification can be according to methods disclosed in US Patent Publication No. US2022/0269890, the disclosure of which is incorporated herein in its entirety by this reference. In various other implementations, identification of a customer or other non-employee can be by skeletal recognition, gait recognition and/or clothing recognition. In one aspect, a unique identification for a human recognized as a customer does not include personally identifying information. In an implementation, a unique identification can be a "generic" identification for privacy reasons, for example if the detected human is determined to not be an employee associated with the location.

In an exemplary human activity recognition process, the following workflow can be relevant:
Identify a human silhouette from acquired video stream information and generate a unique identification for that silhouette, where the unique identification can exclude or include personally identifiable information.
Generate a detected event associated with an identified silhouette and record all activities associated with that silhouette over a timespan of interest, which could be the duration of an event being monitored or tracked at the location.
Detected event may be identified at this time or identification can be generated later by analysis of subsequent human and/or object-related activity.
Monitor video stream data acquired from a plurality of IP video cameras to detect and identify interactions of that uniquely identified human silhouette with objects, areas, and other silhouettes during the event.
Determine whether the silhouette is performing activities defined as being associated with an event or other higher-level activity of interest for monitoring or tracking at the location.
Generate information associated with the performance and provide to an owner or manager of the location and/or incorporate in a report, dashboard, notification, or for use in monitoring of a subsequent event at the same or a different location.

In operation of the visual AI engine, an automated detection and tracking process comprising five main processes can be implemented:
Multi-Object Tracker (MOT). MOT is a model that is configured to detect and track humans within a camera's field of view. Once the camera has sufficient resolution of a person's face, it can perform facial recognition to classify them as a non-employee (customer) or an employee. It can further categorize them as an employee type, such as but not limited to a salesperson, sales manager, or service advisor. MOT can then calculate the person's position in 3-dimensional coordinates and log that person's position within a facility or location over time, also known as a track.
Track Manager. The Track Manager can be configured to ingest a collection of tracks from the MOT for every IP video camera to which it is connected in the IP camera network operational at the location. This can allow scalability as to the number of cameras that the IP video camera network can support.
Track Associator. The Track Associator can be configured to evaluate all or substantially all camera-generated tracks from every IP camera in every room in the location to build timelines of a person's location within the overall facility across all cameras. This can be based off of the association from a person's temporal and spatial location and facial embeddings from facial recognition.
Database. The database can comprise a single repository of all or substantially all information generated by automated detection and tracking for non-volatile storage of all or substantially all configuration data and information generated from analysis of the acquired video stream data.
Event Triggering. The Event Triggering system can be configured to utilize the tracks processed by the track associator to generate alerts for user-defined activities sub-actions or chained-actions. As an example of the utility of the event triggering functionality, the event triggering system can be configured to provide near-real-time alerts of the presence or lack of interactions between customers and employees throughout a facility.

By way of explanation, and in various implementations, the system can be configurable to track one or more persons visible within a camera's field of view and to calculate each person's position in a three-dimensional coordinate system. The system can also log that person's position within a location via one or more IP video cameras over time and/or create a track that can be monitored. An event tracking manager can be configured to ingest collections of tracks from a multi object tracker for every camera that is engaged with GPU server in an IP video camera network installed at the location. In significant implementations, the system can be configured for a collection of IP cameras, such as up to 10, or 20, or 50 or more. The event tracker can be configured to analyze each of the tracks generated from every camera in the IP video camera network to build timelines of the person's location within the facility across all the cameras present therein. This fusion piece can be configured to associate a recognized person's temporal and spatial location, optionally using facial recognition in some implementations. The information generated from the visual AI engine and the associated acquired video stream processing can be stored in a single database to enable easy storage and retrieval as needed. The event triggering system can be configured to generate alerts for user defined activities or sub actions or change activities.

The IP video cameras used herein can allow accurate identification of humans in video stream information acquired therefrom without the need for anatomical markings and without the need for cameras with depth sensor functionality (e.g., Kinect®). The IP video cameras are also stationary or static when the video stream information is acquired, thus distinguishing the processes herein from methods of human or object detection acquired from moving imaging devices, such as those present on vehicles. The stationary or static IP video cameras can be pre-installed in the location of interest for monitoring or tracking of an event of interest, such as being previously configured for use in surveillance of employees and/or property.

In some implementations, a video stream for the event of interest can be analyzed with a single visual AI model. For example, a single activity may be of interest for monitoring or tracking during an event, such as whether a human recognized as an employee properly greets a human recognized as a potential customer in a car dealership. In another example, an activity of an object may be of interest, for example, whether a vehicle recognized as a car that exited for a customer test drive has returned. Yet further, a single visual AI model can be for an activity involving both a human and an object. As an example of this implementation, a visual AI model configured to recognize that a human known to be an employee checked a vehicle recognized as being in service at a dealership for windshield damage or for tire pressure can be deployed to determine whether such activities did (or did not) occur.

In further aspects, a plurality of visual AI models can be deployed to analyze video stream data associated with an event to determine whether a collection of human and/or object-related activities associated with an event did (or did not) occur. The human and/or object-related activities of interest can be designated as a collection of activities that make up a top-level activity. In other words, an event of interest for tracking can be a process and a collection of human and/or object-related activities associated therewith can be sub-processes that operate together to complete the process. In some aspects, the sub-processes themselves comprise one or more base-processes. The inventors herein have recognized that by breaking each event of interest into discrete elements comprising a plurality of human and/or object-related actions, accurate information about a business or other process can be derived with a high degree of confidence. In this regard, complex event processing can be considered to comprise a collection of chained actions, which can be a set of sub-actions that must occur for the overall event to have been completed. For example, an event can be defined as comprising a collection of events, each of which can be of interest for monitoring or tracking in a particular context.

A significant insight of the inventors herein is that many, if not most, of the activities that can be associated with an event of interest can be trackable from video stream data as sub-processes and base-level processes that occur across a number of higher-level activities, many of which include the same or similar activities. The similarity of activities between and among different events can facilitate repurposing of different visual AI models.

Figure 2:
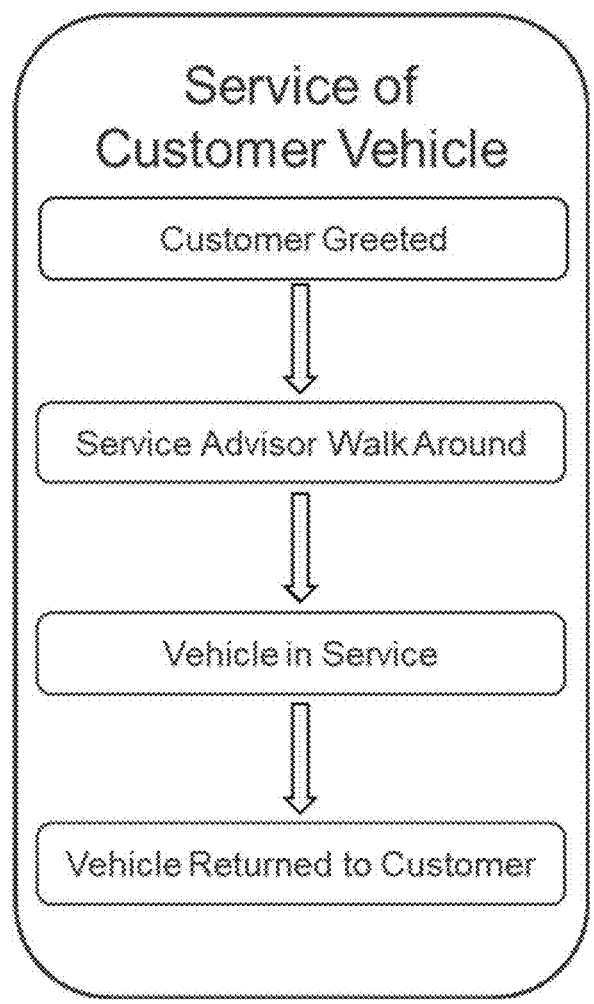
FIG. 2 illustrates an example of sub-level processes of top level processes, in accordance with various embodiments of the present disclosure. Sub-Level Processes include intermediate action recognitions for specific events that are constituent to other events for assessing that a top level process occurred. Sub-level processes can be defined as a sequence of chained events that can be made up of lower-level event recognition models and algorithms.
Figure 3:
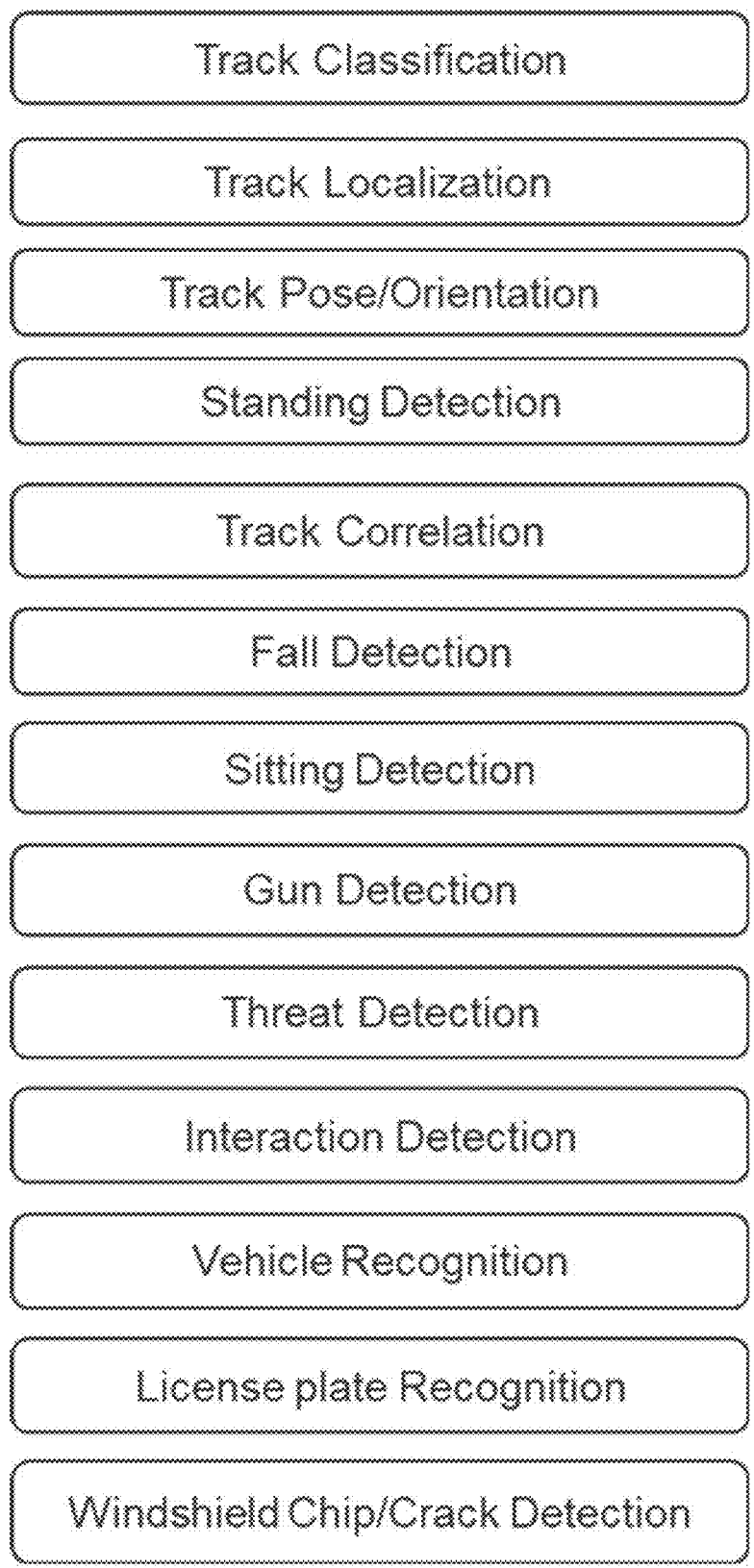
FIG. 3 illustrates an example of base-level processes, in accordance with various embodiments of the present disclosure. Base-Level Processes are the fundamental models that can be used throughout many of the recognitions and triggers for the visual AI intelligence engine. Base-level Processes do not generally generate a trigger by themselves, except for Fall and Gun Detections. Base-level processes can maximize code re-use to develop algorithms to perform recognitions of behaviors and events without committing vast resources and time to train a machine learning model. Base-learning processes allow for rapid development of new capabilities, scaling, and extending functionality that is non-domain specific.
Figure 4:
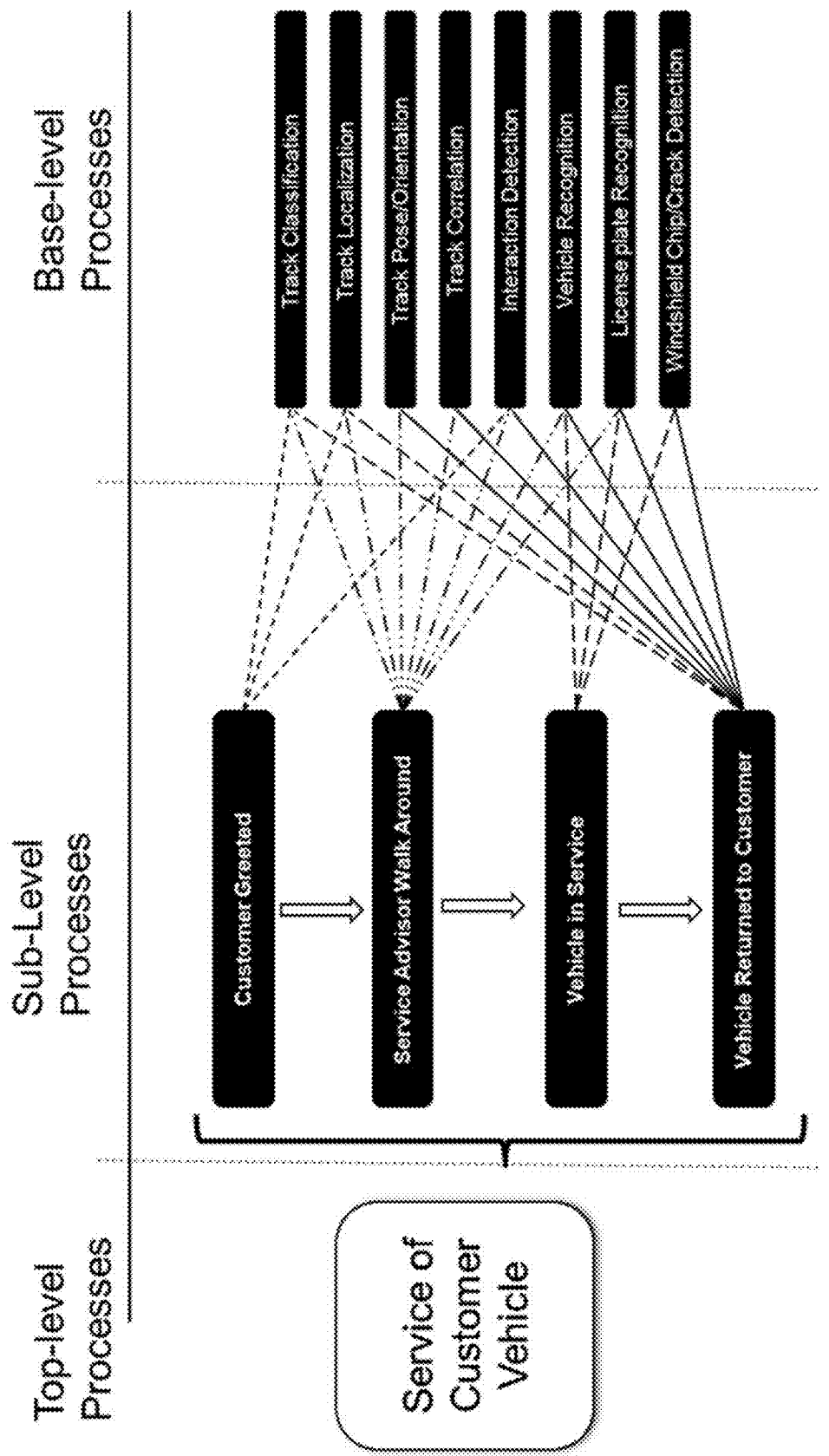
FIG. 4 illustrates an example of a top-level process or event of service with associated sub-level processes which are associated with base-level processes, in accordance with various embodiments of the present disclosure. The "Service of a Customer Vehicle" event (top level process) comprises 4 activities (sub-level processes). These 4 activities (sub-level processes) comprise 8 models or algorithms (base-level processes) that determine if the event occurred. The base-level processes are commonly used between the various events to allow for re-use and to quickly develop new events for detection (top level processes) or individual activities that make up the top-level processes (sub-level processes).
Figure 5:
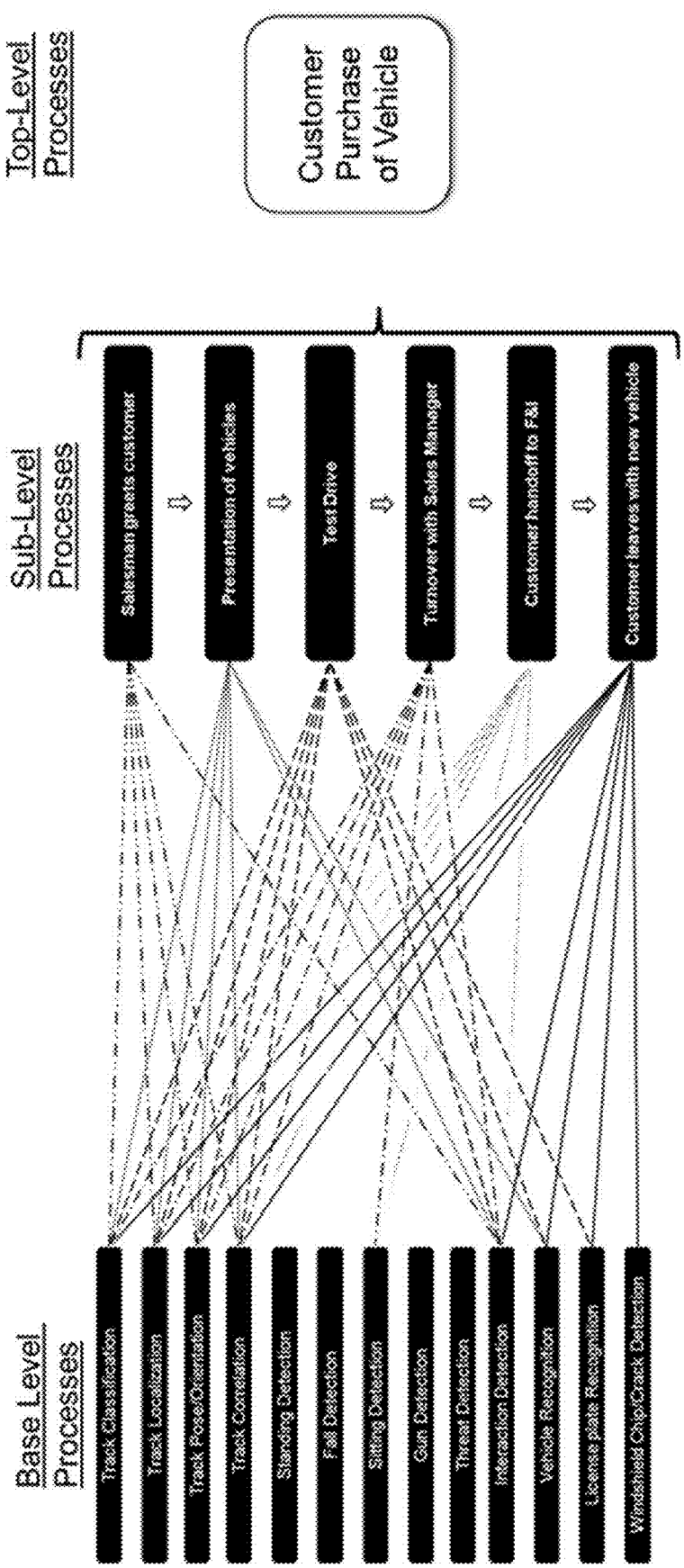
FIG. 5 illustrates an example of another top-level process or event of service with associated sub-level processes which are associated with base-level processes, in accordance with various embodiments of the present disclosure. The "Customer Purchase of a Vehicle" event (top level process) comprises 64 activities (sub-level processes) utilizing multiple models or algorithms (base-level processes).

Referring to FIG. 1, a plurality of exemplary top-level processes—or "events"—of interest for monitoring at a car dealership are listed. In FIG. 2, an example of the top-level process of service of a customer vehicle is specifically illustrated as a plurality of sub-processes that collectively make up the top-level process or event of servicing a customer vehicle. In FIG. 3, an example of a plurality of base-level processes is illustrated, each of which can be associated with individual visual AI models present in the visual AI library and that can be identified as being relevant to the detection of the top-level process by way of their association with relevant sub-processes, such as those defined in FIG. 2. In FIG. 4, the top-level process or event of service of a customer vehicle is shown with associated sub-level processes which are, in turn, each associated with a plurality of base-level processes that can be detected using relevant visual AI models available for use with the visual AI engine methodology herein. In FIG. 5, the additional top-level process of a customer purchase of a vehicle is shown as a plurality of sublevel processes which are, in turn, made up of a plurality of base-level processes.

Using a vehicle purchase event at a car dealership as an example, a workflow associated therewith can include, for example, a potential customer being greeted by an employee, a walk through and among the cars available on the dealership lot, a test drive of one or more vehicles by the potential customer, negotiation with one or more salespersons, vehicle trade in evaluation, financing, and vehicle preparation. Each of these events together can comprise relevant aspects of the event that is defined as a "vehicle purchase." By dividing a complex event into smaller sub-parts that can each be analyzed by individual visual AI models via the GPU server and associated components, the utility of visual AI in business processes and other uses can be expected to be improved.

The ability to reuse or repurpose visual AI models for use in monitoring different types of events, locations, processes etc. has been found to enhance development of event monitoring for new users. Moreover, the inventors have determined that many activities being tracked are non-domain specific, meaning that customized visual AI model development can be avoided in many situations. For example, an event that includes monitoring of whether a potential customer or non-employee greeting occurred and how long it took to complete, can be expected to be recognizable substantially independently of a business type or the location where the monitoring is taking place. The ability to reuse visual AI models based on a definition of a subprocess—for example, a generic "greeting"—that is an element of a higher-level process—the event of interest for monitoring such as a customer service interaction at a location—is believed by the inventors herein to be a substantial improvement over prior art visual AI processes.

In another example of visual AI model repurposing, the activity of a service advisor walking around a customer's car to evaluate the car for a service event typically can incorporate substantially the same activity as when the service advisor conducts a quality check when returning the car to the customer. Similarly, a final check of a vehicle at the end of a purchase event can also involve the same steps. While each of these events comprises a plurality of activities or steps, at least the step of an employee walking around the car and checking various parts or aspects of the vehicle prior to releasing the vehicle to a next step or activity can substantially be the same. Thus, a visual AI model that is configured to detect whether the employee walked around the vehicle can be deployed for use in monitoring or tracking different events.

Using another car dealership example, a vehicle that is being brought onto a car dealership by a customer as a trade in is examined to determine the condition in order to generate a valuation. The evaluation for trade in value can be defined according to a workflow to ensure that all relevant aspects of the car are assessed. Similarly, the arrival of a vehicle for a service event may also entail a review of the vehicle for condition. While the review of a vehicle for a trade in may comprise a more detailed review, at least some of the vehicle review activities or steps can be the same as those conducted for intake of a vehicle for a service event. For example, each event will include at least a recording of mileage, exterior and interior damage assessment, among other things. Each of these overlapping tasks or activities underlying an event of interest can be deployed as individual visual AI models in a plurality of events of interest for tracking.

Furthermore, a specific business type can be expected to have similar event recognition and, optionally, identification needs as businesses of a similar type or classes. In this regard, a group of car dealerships may likely be interested in tracking similar, if not many, of the same types of processes and sub-processes. A collection of visual AI models can therefore be packaged for use according to a type of business where events are being monitored or tracked. In such an implementation, a business type can be identified and a collection of visual AI models configured for monitoring or tracking of one or business processes relevant to or associated with that business type. A suitable collection of visual AI models can be provided to an owner or manager of that business for deployment on its own IP video camera network. In other implementations, the owner or manager can select some of the available visual AI models for use in an IP video camera network from a collection of visual AI models configured to recognize and, optionally, identify human and/or object-related activities that may have relevance to one or more for interest for monitoring or tracking at a type of location.

An owner or manager of the activities associated with the location in which the IP video camera network is operational can define criteria for human and/or object-related activity detection, such as by selection of an activity of interest for monitoring or tracking at the location from a list of activities associated with set up of an event recognition or identification workflow to be operational with the visual AI engine. Alternatively, the owner or manager can provide a description of a human and/or object-related activity of interest for monitoring or tracking and the system can be configured to selected one or more visual AI models from which such activity can be recognized and, optionally, identified, whereby such selected models can be operational with a GPU server and associated componentry operational at the location. Yet further, the system can automatically suggest a plurality of events of interest for tracking, detecting, monitoring etc. based on the type of business, where the type of business can be classified by standard business categorization codes such as Standard Industrial Classification (SIC) and North American Industrial Classification System (NAICS) codes. The owner or manager of a location where the IP video camera network is operational can also provide a general description of the business and the system can return suggested visual AI models configured to recognize and, optionally, identify activity relevant to the event of interest.

In some aspects, the visual AI models used for human and/or object-related activity recognition and, optionally, identification can be derived from one or more open source visual AI libraries and deep learning methods. For example, OpenCV and Inceptionv3 can be used in the development of the visual AI models. Visual AI development can also be assisted by use of various validated human activity datasets, such as the Kinetic 400 library of human actions. Such open-source visual AI models can provide specific human activity recognition using well-validated models such as, standing detection, fall detection, sitting detection, walking detection, running detection, etc.

In further implementations, the owner or manager can select or deselect suggested visual AI models to be deployed using the IP video camera network at the location. In this regard, the systems and methods herein can be customized according to the needs of the owner or manager of a location where the IP video camera network is operational in need of monitoring for one or more events of interest.

In various aspects, each visual AI model operational in the visual AI engine can be configured to generate information associated relevant to an event of interest, where at least some of the information can be defined by the owner or manager of the location in which the event of interest is being monitored or tracked. For example, an owner or manager may desire to understand whether the person associated with the event of interest for monitoring or tracking is male or female, old or young, short, or tall, or any other definable category that may be of interest. The systems and methods can be configured to provide different notifications based on an identification (or lack thereof) of a specific feature. An owner or manager of a location where an event of interest is being monitored or tracked may wish to assign certain employees to help different customers based on skill sets or preferences. When a person having those characteristics is recognized from processing of acquired video stream information, a notification can be generated to the employee to ensure that that employee is the one that is dispatched to help the identified individual.

In further implementations, visual AI models can be provided for events that are of high value for detection in the context of any event occurring at a location. In this regard, gun detection or fall detection can be activities that may be of interest for recognition and, optionally, identification irrespective of the type of event that is being monitored or tracked at a location. For example, if a person enters a location where the IP video camera network is operational carrying a gun and guns are not allowed at that location, an owner or manager—and possibly a security agency or a police department—would likely seek to obtain a real-time notification thereof. In this regard, various gun detection algorithms can be deployed by the visual AI engine to generate the required real-time notifications. Various other threat-detection algorithms exist today and may be created in the future. These could be useful to detect human activities of interest such as fighting between persons that could be of interest for detection to better ensure the safety of customers and employees. Fall detection methods can also be useful in this regard. In some implementations, the deployment of such safety-related visual AI models can be required or mandatory in every deployment of the visual AI engine methodology herein. Such required visual AI models can be incorporated in the visual AI engine by default and cannot be deactivated without administrator approval. At least some visual AI activity detection models can automatically be incorporated with the visual AI event tracking and monitoring systems herein without need for an owner or manager to select them for use therein. Such visual AI models can also be mandatory for inclusion in a visual AI engine in use at a location, for example for compliance, legal, or other reasons.

A notable insight of the inventors herein is the recognition that every business type operates according to a set of activities that can be pre-defined and provided as a workflow that can be associated with a specific event. At a minimum, for each business process in which a customer is involved, there can be expected to be a collection of activities (or steps) that employees are—or should be—trained to perform in order to successfully complete a job function that is associated with service provided to that customer which, in the context of the present disclosure, can be termed "an event of interest." In implementations, one or more persons associated with an event of interest at a location where an IP video camera network is operational can be detected from video stream information at a first time. The system can be configured to generate a unique identification for each of the one or more persons of interest. That generated identification is durable for a period of time that is at least as long as the event that is being monitored or tracked is underway. For example, the identification of the one or more persons associated with the event of interest can allow unique identification of each person from the acquired imaging information for a period of time associated with any and all activities relevant or associated with an activity of interest at the business or other environment in which those one or more persons are participating.

At least one of the persons who is being identified in acquired video stream data can be a customer who is being monitored or tracked at the location where the IP video camera network is operational. For example, a time that the customer is present at that location can be monitored or tracked and some or all of the activities associated with that customer's presence at the location can be recognized and, optionally, identified from the acquired video stream information. This can include monitoring or tracking of interactions with other persons at the location where the IP video camera network is operational, such as one or more employees who may be relevant to one or more tasks or activities associated with the customer's visit to the location.

In regard to generating of a unique identifier to monitor a person visiting a location where the IP video camera network is operational from the acquired video stream information, in a first implementation, the unique identification generated for the person of interest does not include facial recognition. By removing facial recognition from the unique identification process, the owner or manager can avoid privacy objections or legal liability associated with unapproved use of such information. In other implementations, the system can be configured to automatically mask or block the face of the person using known methodology.

In the absence of facial recognition being used, the unique identification can instead be generated based upon identification of a person's gait, skeletal features, height, limb length, or other information that is suitable to align an individual present in a video stream with an identification suitable for the event of interest. In fact, any feature or characteristic associated with an individual present in a video stream may suitably be used to generate a unique identification of that individual in the context of an event of interest. To this end, clothing, jewelry, shoes, etc. can be used in generating a unique identification for an individual present in a video stream. In various implementations, a unique identifier can be generated for each person or present in a video stream associated with an event of interest. Such unique identifier can include one or more features associated with a person of interest. Still further, there can be at least two identifying features associated with a person of interest.

As would be appreciated, generation of a unique identification for a person based on information such as a gait, skeletal features, height, clothing, etc. may not be considered to be unique in the context of a large number of people. That is, in a large population of people, identification via ostensibly non-unique features might not allow distinct identification of a person in video stream information without facial recognition. It can be understood that the identification generated for a person in accordance with the present implementation may be "unique" for the purposes of monitoring or tracking a specific person of and through a scene or location during a time period of interest—that is, an event occurring at a business or other location of interest for being monitored or tracked. However, such an identification may not be sufficiently "unique" to allow that same person to be monitored or tracked outside of an event currently being monitored or tracked at a location at least because there are likely to be other people having those same identifying features (e.g., height, clothing, etc.). The unique identification generated can allow that specific person and activities associated with that person to be monitored or tracked at a location as long as there is a low probability that another person in a location having the same identifying characteristics used to generate the unique identification will also be present in the location at the same time as the first person. In other words, identification of each person at a location during an event of interest has been found to allow unique identification that is sufficiently good for use in the methods and systems of the present disclosure.

In some implementations, the system can generate a probability that another person present in the same location during the same event being monitored is likely to also be associated with the same features used to create the unique identification for the person of interest. For example, acquired video stream data can be analyzed to determine a confidence level that a generated unique identification is associated with a single person who is present at the location where the IP video camera network is operational during an event of interest.

In further implementations, the system can be configured to generate a unique identification for a person of interest for monitoring or tracking at a location using a minimum number of identifying elements needed to substantially prevent misidentification of another person that may be present at that location during the event of interest. For example, the system can be configurable to determine a degree of uniqueness associated with a feature or characteristic that is identifiable from acquired video stream data. If a feature or characteristic is sufficiently unique to make it unlikely that another person may also possess that same feature or characteristic, a smaller number of features or characteristics may need to be detected to generate a high probability that a unique identification is correctly ascribed to a person.

In some implementations, a unique identifier can also be generated for one or more employees who may be of interest for monitoring or tracking at the location where the IP video camera network is operational. When the human can be identified from a subject video stream using one or more of gait, skeletal features, height, clothing, etc. and there is a low likelihood that an appearance of another human in acquired video stream data could be misattributed to the other human, a generated unique identification can have utility in monitoring the activities of the person via the unique identifier.

Put another way, as long as each person of interest for monitoring or tracking in a scene or location in relation to an event being tracked therein can be uniquely identified as to that event, an identification used to monitor and track that person in acquired video stream data is sufficiently unique in context.

In further situations, there may not be sufficient uniqueness among several persons who are relevant to a monitoring or tracking event to allow human activity recognition and, optionally, identification for that specific person to appropriately be made with a high degree of confidence. That is, while it may be likely that a person visiting a scene or location as a customer could be uniquely identifiable in a single visit via features such as silhouette, gait, height, clothing, etc., it might be less likely to be able to confidently use such features when employees are being tracked as to their activities, especially when an event for which their activities are relevant may take place over an extended period of time and at various places in the location where the IP video camera network is operational. Additionally, employees may be required to dress in a way that makes it less likely to distinguish different people automatically from a video stream. This can happen, for example, when employees are required to wear uniforms, standardized clothing (e.g., shirts of the same color, pants of similar design) or the like.

By reducing the number of people in the location who are being monitored or tracked using substantially non-personalized information (e.g., gait, silhouette tracking, clothing, etc.), the accuracy of monitoring or tracking of participants in and through an event of interest from acquired video stream information can be improved. An ability to use facial recognition for an employee can be expected to give rise to fewer/lesser privacy and legal issues than with persons who are present at a location where the IP video camera network is operational as a customer, invitee, etc. At a minimum, as one of the conditions for employment, the employee can be required to "opt in" or otherwise participate in tracking of their movements in and around the environment. Other persons who are present for business reasons, such as vendors, delivery persons, contractors, etc., can also be required to opt in or otherwise participate in facial recognition as a condition for doing business at the location. Still further, a person at a location where human and/or object-related activity relevant to an event being monitored or tracked is not a customer can be required to provide their cellular phone identification as a condition of entry onto the location for business purposes. Their cellular phone can be monitored or tracked as a form of unique identification for that person while they are at the location. Such entry can also be associated with the wearing of a badge or a wearable device that can be tracked according to a geofence defined by an owner or manager of an event that is of interest for tracking at the location. However, as discussed previously, any recognition and, optionally, identification is generated using vision-based methods according to the processes herein.

In further implementations, a potential customer or non-employee can opt into facial recognition when they are present at the location where the IP video camera network is operational and where video stream data associated with human and/or object-related activity is being generated. The systems and methods can thus be configured to determine whether a potential customer or non-employee associated with an event of interest has consented to be specifically monitored or tracked when they are present at the location where the IP video camera network is operational for collection and analysis of video stream data. When a person who has opted into facial recognition is associated with an event that has been detected and identified from acquired video stream data, activities relevant to that person—and the reason that they are present at the location in the first order—can be better monitored or tracked. For example, an owner or a manager can ensure that a customer who has signed up for a "VIP" or "White Glove" experience actually obtains that level of customer service.

When a potential customer or non-employee who has opted into facial recognition is identified, a notification can be generated to alert any relevant persons of the presence of that person at the location where the IP video camera network is operational. An owner or manager can also derive information from a collection of video stream data generated from a plurality of events to assess the performance of employees vis a vis one or more potential customer or non-employees who have opted into facial recognition for the purposes of providing them with enhanced customer service, or for any other reason.

Object recognition can also be used to generate an enhanced customer experience at the location where the IP video camera network is operational. For example, a vehicle associated with a known or knowable customer can be identified by make, model, color, etc. from acquired video stream data. More specific identification can be via identification license plate data from acquired video stream data. If that vehicle plate is associated with a customer who is known by the dealership, an event of interest can be generated for monitoring or tracking. In a case of a service event associated with that vehicle, the event can be monitored or tracked to assess whether (or not) a collection of activities relevant to that event occur whereby the vehicle can be tracked along with human activities associated with the service event. In this regard, the service event can be a main process, and each of the human and/or object-related activities associated with completion of that process can comprise sub-processes of the process or, in some implementations, various sub-processes of one or more of the sub-processes.

Each event of interest for monitoring or tracking can comprise a collection of steps that are relevant to assessment of whether that process has been substantially completed according to a generated workflow. For example, and again using the car dealership example, a service event can be identified when a person who is not an employee is identified from a video stream associated with the service department. When the customer arrives in the dealership service bay, they remain in the car to be greeted where the greeting is by a dealership representative, such as an employee. The event of interest for monitoring can be initiated by recognition of a newly arrived vehicle in the dealership. In this case, an object—here a newly recognized or identified car—can serve as an activity that starts the event and a time can be assigned thereto. In this example, the event of interest for monitoring or tracking can be created using recognition or identification of an object—here the car—that is proximate to a location where an event is likely to occur—here the service bay of the dealership. Establishing an event of interest for monitoring or tracking can beneficially be conducted using object recognition in this situation at least because person who is driving the car could be difficult to identify when sitting in the car without using possibly facial recognition techniques. As would be appreciated, this service event could also be tracked or monitored by recognition of a driver who steps out of the car at or near the service bay. In this case, it would be beneficial to link or connect a unique identification for the driver with the car. However, since reliance on recognition of an event of interest for tracking may actually begin prior to generation of a unique identification for that person, in some situations, it may make sense to start an event for tracking using an object activity recognition only. To this end, if the driver of the car is required to leave the vehicle prior to the event of interest for tracking being initiated, the time that they wait prior to being greeted by a dealership representative may not be accessed. It follows that the recognition and, optionally, identification of activities relevant to an event of interest for monitoring or tracking at the location where the IP video camera network is operational may depend on the context of the specific higher-level activity being tracked and to which various other activities are chained in an event monitoring process. An event of interest for tracking at a location can be detected and identified from video stream data using human recognition, object recognition, or a combination thereof.

In an exemplary implementation in the context of a vehicle service event, video stream data can be generated from a plurality of IP video cameras in communications engagement to provide the IP video network operational at the location, including vehicle entry onto the lot, entry of the vehicle into a service bay, movement of the vehicle between and among various locations in the dealership, and return of the vehicle to a potential customer or non-employee. Activities associated with the service event of interest for monitoring or tracking can be associated together as a collection of human and/or object-related activities relevant to the event of interest for monitoring or tracking at the location, and video stream data associated with the event can be analyzed to determine whether each of the activities defined as pertinent or required for completion of the vehicle service event did (or did not) occur during the service event.

In another example, when a person who can be identified as a "non-employee" or "potential customer" enters a car dealership, employees are typically trained to approach that customer and greet them to see what assistance they might need. The event of interest for monitoring or tracking in this context can be for assisting a potential customer. Typically, a plurality of salespeople may be present at the dealership at a single time, where a single salesperson may be "on deck" when the "non-employee" or "potential customer" enters the dealership. That salesperson is then expected to greet that person within a set period of time according to pre-defined customer service workflow. The system and methods herein can be configured to recognize the person who enters the dealership as a "non-employee" or "potential customer" and the event of interest for tracking generally as a "non-employee interaction" or a "potential customer interaction" where a dealership employee is needed to engage with the recognized person within a certain period of time, as defined by the dealership's customer service rules. The system can be configured to analyze, via a visual AI engine operational therewith, acquired video stream data from one or more IP video cameras, where such acquired video stream data is associated with an event of interest for monitoring or tracking. In this example, the acquired video stream data associated with a recognized event can be analyzed using relevant visual AI models to determine whether a dealership employee approaches the non-employee or potential customer and whether the employee engages in a greeting of that person within a defined period of time. In this case, the greeting is a human activity that is of interest for monitoring or tracking at the location, where the presence (or absence) of the greeting is determined by comparing the video stream data with one or more relevant visual AI models.

While a common greeting type between two people is a handshake, a number of potential greeting types can be included in the visual AI models to better ensure that the video stream data provides accurate information about the compliance of the employee with dealership customer service requirements. To this end, the visual AI models operational with the visual AI engine can include a human activity task of interest for recognizing, such as a greeting, and a plurality of potential possible responses that are sufficient to complete the defined task can be provided, such as a handshake, fist bump, elbow bump, wave, etc.

In further implementations, a human associated with the location or business can provide visual information via movement of their body, where such body movements are recognizable by the system as being related to a specific task. In this regard, a process akin to semaphore signal arms can be used. As would be appreciated semaphore signal arms are used to transmit visual signals over distance by changing the positioning of a person's arms, or more broadly, their body parts. A specific task being performed by a person can be associated with arm or body part positioning that is recognizable by the system. The arm or body part positioning can be associated with an overall task or the phase or part (e.g., beginning, middle, end, etc.).

For example, a technician who is performing an oil change on a car at a dealership can indicate a start of the process by elevating their arms in a specific defined manner recognizable by the system as being associated with the start of an oil change. The arm or body part signaling can indicate that they are starting on an oil change and where they are in completing that process. Similarly, the end of a previously started oil change can be associated with a different, and distinguishable arm or body part positioning.

Use of a semaphore signaling process can enrich knowledge of where in a timeline a specific task is situated. In this regard, the system will not be able to determine if a service for which a vehicle is sitting in a service bay has been completed if there is no information relevant thereto derivable from the scene. Moreover, a vehicle sitting in a service bay may be there for a plurality of service tasks. When a technician can provide the system with visual information about the status of their work, it can be expected that improvements in workflow at a location can be provided.

Additional information can also be associated with the presence (or absence) of a performance of a defined human activity task, where such information can be indicative of completion of the task. The systems and methods can be configurable to identify such additional information. For example, a greeting of a non-employee or potential customer by an employee can be expected to be associated with an approach of the employee to a location closer to the person who is being greeted. When the employee—and the other person—are engaged in a greeting, they are likely to be facing in the same direction and within a few feet of each other. The system can thus be configured to detect and identify such additional human activities to augment or enhance the correct identification of a greeting in context.

The time it takes the employee to complete the greeting can also be a relevant element of the sub-process of greeting the non-employee/potential customer. The time it takes an employee to recognize the presence of the potential customer or non-employee in the dealership can therefore be monitored or tracked. In some implementations, if too much time passes before an employee is identified as moving in the direction of the potential customer or non-employee, a notification can be sent to one or more employees, such as via a text, signal to a wearable device, an automated announcement, or the like. It can be expected that automated identification of a potential vehicle purchase as an event and monitoring or tracking the actions associated therewith can enhance customer service associated with that event and, in some cases, may even increase the probability that the potential customer service event may be transformed into an actual vehicle purchase event.

Depending on context, an expansive list of information can be relevant for monitoring or tracking at a location where the IP video camera network is operational. Using the car dealership as an example, the following events can be of interest for tracking or monitoring or tracking to ensure, confirm, or validate that one or more human- and/or object-related activities did (or did not) occur:
- Potential customer vehicle purchase
- Actual customer vehicle purchase
- Service of a customer vehicle
- Detection of a gun
- Detection of a fall
- Extended wait/idle times
- Surges of activity
- Condition of areas (e.g., cleanliness, supplies, etc.)
- Non-compliant employee activities (smoking, no required safety equipment, etc.)

In some implementations, the identification of an event for monitoring or tracking at the location where the IP video network is operational can be modified according to the context of the identified activities. In this regard, a potential customer vehicle purchase can become an actual customer vehicle purchase when the potential customer or non-employee is recognized and, optionally, identified as leaving the dealership in a car that is known to be owned by the dealership. Such an activity can comprise a subprocess of a potential vehicle purchase in the form of a test drive. The time that the potential customer or non-employee is away from the dealership can also be monitored or tracked, as well as any GPS information associated with the test drive. When the potential customer or non-employee returns to the dealership, the subprocess of employee follow up can be monitored or tracked vis a vis recognition and, optionally, identification of other human and/or object activities occurring thereafter. The potential customer or non-employee can retain their unique identification as generated when they first entered the dealership and the event of a potential vehicle purchase can continue to be monitored or tracked. If the activity of the potential customer or non-employee is recognized and, optionally, identified as the person's leaving the dealership after completion of the sub-process of a vehicle test drive, the event of a potential vehicle purchase can be ended. If the activities of the potential customer or non-employee and employee are recognized and, optionally, identified as moving together to a desk, the system can then detect that the event of a potential vehicle purchase has become an actual vehicle purchase, which can now be monitored or tracked as a different event having a plurality of sub-processes each comprising a plurality of human and/or object-related activities.

Depending on the context of a specific event being monitored or tracked at a location, a plurality of visual AI models can be deployed in concert, where each visual AI model is configurable to recognize and, optionally, identify one or more aspects of a human and/or object-related activity of interest. For example, if an employee is required to wear a hard hat when participating in an activity associated with an event of interest for monitoring or tracking at a location where the IP video camera network is operational, a first visual AI model associated with human recognition and a second visual AI model associated with the recognition of clothing can be deployed in tandem to determine whether the human, who is detected as an employee according to the methodology herein, is wearing the hard hat as required. The recognition of each of the human who is an employee and the recognition of a hat in the same general vicinity (e.g., 1 meter) can return a determination that the employee is wearing the hard hat as the activity of interest. In such a situation, if the required human activity is wearing of safety gear while present in a location where an IP video camera network is operational and a human is recognized as not wearing that required safety gear-here a hardhat-a notification can be provided to the owner or manager of the location or to the person who is not wearing the hardhat as required. As described in detail herein, a person can be monitored or tracked across multiple cameras over a period of time, such as when he is working on a location. If an event of interest is defined as Person 1's presence on a worksite requiring the wearing of safety gear for the entire period that he is present, the system can provide information about his compliance to such requirements. Information about the compliance (or lack thereof) of one or more persons on the location can also be stored for historical purposes, such as for use in legal or regulatory compliance purposes.

In another example, the absence of an object of interest in acquired video stream data can also have relevance to an event of interest for monitoring or tracking at a location. For example, in a restaurant food pickup situation, a proprietor may be interested in monitoring or tracking the arrival of patrons so that the food can be either delivered to their car in a timely manner or removed from the kitchen for in-restaurant pickup so the order remains hot longer. In this regard, a visual AI model can be configured so that a plurality of IP video cameras located outside of the restaurant can recognize and, optionally, identify a patron's vehicle upon entry into the vicinity of the restaurant, such as in a parking lot associated therewith. The patron can self-identify their vehicle by make, model, color, etc. in conjunction with their food order, and those features can be recognized when the vehicle enters a geofenced area, for example. In other implementations, a customer ordering app can record information associated with one or more vehicles that the patron may use on a regular basis, and the system can be configured to recognize a specific vehicle when the patron enters the parking lot. The system can also be configured to identify a license plate on the vehicle or other identifiable feature to specifically distinguish vehicles that are otherwise similar (e.g, the same make, model, color, etc.)

Upon recognition and, optionally, identification of a particular vehicle that is associated with a patron that has a restaurant order in need of picking up, a notification can be provided to an employee in the restaurant. Such notification can be part of a restaurant workflow relevant to completion of the patron's order, where completion is handing off a fully completed order to the patron. For locations where parking may be limited, better traffic flow of patrons can also be a benefit.

The restaurant pickup methodology herein can also have utility in facilitating management of food delivery service pickup. In this regard, the ability to know when a delivery person's vehicle has entered into a parking lot of a restaurant can reduce the person's wait time and, therefore, provide a higher likelihood that the food delivery will be hot when it ultimately makes it to the customer. Also, smoother food delivery service pickup can reduce congestion inside of the restaurant, as well as improving the experience of in-person diners who may not appreciate entering a restaurant that may be crowded with food delivery persons.

For example, in a further example of use of the methodology herein in a restaurant environment, the presence of a filled beverage glass on a patron's table may be of interest. A visual AI model associated with a filled glass can be deployed to recognize whether a glass is empty at a table or at a plurality of tables. The absence of patrons dining at a table can be a human activity of interest when an object can be empty or partially empty plates. The absence of human activity with empty or partially empty plates can provide information that the patrons have left and the table is ready to be cleaned and set up for another group of diners as the event of interest for monitoring or tracking. A notification can be provided to a relevant person of the need to turn over the table. A second notification can also be provided to a maître d' of the restaurant to notify them that waiting patrons can be brought to the table. Yet further, a notification can be sent directly to a device, such as a buzzer, to notify the waiting patrons that the table is being cleaned and set up for their arrival. In other implementations, a notification can be provided when a relevant visual AI model recognizes that the table has been set up and is ready for the patrons as the event of interest for detection. For example, if a napkin is detected on a plate when no napkin was detected in video imagery from an earlier time period, that could be an object-related signal that the table has been cleaned and set up for a new group of diners.

The methodology herein can further be configured to allow the monitoring or tracking of a person of interest in a location where the IP video camera network is operational over a period of time to establish whether or not one or more human activities of interest occurred (or did not occur) while that person was present at the location. In this regard, the methodology herein can be configured to monitor or track a person of interest from a first time to a second time, where the first time can comprise a time when the person arrives at the location where the IP video camera network is operational and the second time can be when the person leaves the location. Alternatively, the first time can be the time when the person enters a department in a business or other environment and the second time can be the time when the person exits the department. Yet further, the first time can be the time when the person engages with a second person at the location, such as an employee. In any of these implementations, information about the time it takes for the person of interest, such as an employee, to complete an activity of interest, such as greeting customer, can be derived from video information acquired at the location.

Information incorporated in acquired video stream data relevant to the interactions between one or more employees and a person of interest, such as a customer, can also be useful in some contexts. Such information can be useful to determine whether the time that a person spent overall at the location where the IP video camera network is operational was in accordance with a desired goal or objective set by an owner or manager of the business environment. Such information can also be of interest in determining whether a particular task or collection of tasks associated with the person's visit to the business or other environment of interest was completed in a desired goal or objective set by an owner or manager of the business environment. Still further, such information can be useful to determine whether a person associated with the business or other environment, such as an employee, complied with a recommended or required activity relevant to the person of interest's presence at the location.

In some aspects, the methodology herein can affirmatively define a collection of activities of interest for monitoring or tracking in a location where the IP video camera network is operational, where such activities can be relevant to a more complex process of interest for monitoring or tracking. By specifically defining a set of activities and configuring the system to recognize and, optionally, identify only those activities, privacy of the persons present in that video stream data can be enhanced over that of systems that collect video stream data without reference to the content thereof. When a person enters a location where the IP video camera network is operational where the methodology described herein is in use, the person can be informed that they are being recorded for the purposes of enhancing their experience while they are present at the location. When a person has not opted into facial recognition, they can be notified that they are being uniquely monitored or tracked, but that their personal information is not being collected from acquired video stream data. Such anonymized data collection could enable owners or managers of businesses or other locations to better comply with governmental privacy laws that exist today or that may be enacted in the future.

The alignment of a business with defined customer service objectives can also be enhanced with the methodology herein. For example, if a car dealership defines a collection of activities associated with an event of interest for monitoring or tracking, a time associated with performance of each activity can be derived. Each activity, or "sub-process" associated with the event, or "main process" or "top level process," can be monitored or tracked to generate a time associated with each. For a vehicle purchase, a goal or objective for the overall time to complete the process can be provided. Goal or objective times for the completion of each of the activities associated with the vehicle purchase event can also be provided. The alignment (or lack thereof) of the actual times associated with each of the activities and the overall time for completion of the vehicle purchase can be monitored or tracked.

Areas for improvement or modification of one or more activities associated with a main or top-level process—for example, a target time it takes to complete a vehicle purchase or to complete delivery of a take-out order for a restaurant patron—can be identified and implemented in subsequent processes. Information derived from monitoring or tracking of an event can be used with the methodology herein. In other implementations, one or more employee training activities can be derived from information derived from monitoring or tracking of the individual processes associated with a main or top-level process.

Employee compliance with a defined process and sub-processes associated therewith can be assessed, where such compliance can be used for training or human resource management (e.g., promotion, re-training, or termination). The video stream information generated associated with one or more events can be useful to maintain a durable record for employees. For example, the compliance of an employee with defined activities associated with an event being monitored or tracked at a location can automatically be collected and linked with that employee. An owner or manager of a location or a department can then search for that employee to determine a degree of compliance (or non-compliance) with one or more defined activities associated with their job title or category. If information derived from acquired video stream data indicates that the employee has complied with the task(s) associated with a workflow associated with one or more events being monitored or tracked in video stream data, that employee can be provided with rewards such as bonuses, promotions, etc. If the data show that the employee has not complied with the task(s) associated with the workflow, the employee can be identified for attention by an owner or manager. The employee can also be provided with automatic notification of compliance or non-compliance with a workflow associated with one or more tasks associated with their job or position. For example, if analysis of the video stream data indicates that an employee successfully completed one or more tasks associated with an event being monitored or tracked at the location, the system can be configured to generate a notification to the employee to affirm their efforts such as in the form of a "kudos" or "high five." Information associated with the employee's completion of the task can be provided to the employee's manager and/or noted in the employee's record.

Conversely, if the employee fails to complete one or more of task(s), the absence of the completion of such expected activity can also be the subject of a notification. For example, the employee can be provided with a "gentle reminder" via a notification, their manager can be notified, and/or a record associated with the employee can be populated with the information. The methodology herein can therefore provide an employee with real time feedback of their performance.

Yet further, one or more modifications to an existing workflow can be generated from process and sub-process monitoring. Using the example of a vehicle purchase, such higher-level process typically takes place over a period of time and typically involves several different departments or business functions, each of which operates according to a set of processes and sub-processes appropriate for completion of tasks in each department. The methodology herein can allow monitoring or tracking of an event from video stream data acquired from a plurality of IP video cameras that may be operational in different areas in a location where the IP video camera network is operational. By creating video stream data for an event that is acquired from a plurality of IP video cameras operational at a location, human and/or object-related activities relevant to or associated with successful completion of that event can be holistically monitored substantially independently of the location, department, etc. where each of the activities is conducted.

When an event is associated with a plurality of employees, such as when an event involves multiple activities that are in responsibility of different people and/or different departments, the acquired video stream data can provide insights into whether a particular employee or department is suitably completing the activities defined as relevant to that event. In the vehicle purchase at a car dealership example, the overall time associated with the completion of the transaction is a sum of each of the times associated with completion of the individual activities that together make up a vehicle purchase event. This typically involves multiple departments that may be individually tasked with the respective activities. In many cases, the collection of activities can be stacked, that is, conducted one after the other, which can mean that the event—the vehicle purchase in this example—may take longer than it needs to. By providing insights derivable from video stream data generated from multiple IP video cameras over a period of time associated with the event, it is expected that improved workflows for activities such as vehicle purchases at car dealerships can be developed. In this regard, one or more activities associated with an event of interest—a car purchase in this example—can be identified for association with a modified workflow in subsequent operations of that same or a similar event. For example, one or more activities associated with a car purchase event can be identified for parallel operation in subsequent events with a goal of reducing a total time required for completion of the same or similar event in the future.

In a restaurant example, the time it takes for a customer's experience to be completed can be monitored or tracked. The time it takes for the customer to be greeted and seated by the hostess, met and served, and payment to be completed can be tracked. As would be appreciated, each of the tasks are completed by two distinct operations: "front of the house" and "back of the house," each of which has to function in parallel to ensure that a patron's dining experience is satisfactory. The methodology herein can facilitate coordination between these functions in a restaurant environment by allowing improved monitoring thereof and generating improved workflows, if needed.

Referring again to FIG. 5, a top level process—that is, the event of a vehicle purchase—is shown. As shown, this top-level process is shown as involving a plurality of functions or department tasks at the dealership. In some implementations, it can be useful to consider each of these different functions or department tasks as a top-level process, for example, if information regarding the specific activities underlying each subprocess are of interest for evaluation. Such evaluation can be useful to detect and diagnose problems that may exist that operate to affect a top-level process for which the sub-processes are a key feature. Improvements in subprocesses can therefore be identified and implemented.

For example, while a financing contract is being generated from a customer's information while the customer is waiting idly for the return of terms for consideration, other tasks associated with the vehicle purchase could be performed in parallel. While the financing activity part of the vehicle purchase event is being conducted out of the presence of the customer, the customer can be introduced to the dealership service department and provided with information about that part of the dealership and any benefits associated with use of the dealership service department (e.g., free oil changes, concierge service, etc.). By more efficiently using the time that a customer is present at the dealership, not only can the amount of time that it takes to complete a vehicle purchase be decreased, the perception of being provided with good customer service now and in the future can be enhanced. To ensure that these multiple activities are completed for each transaction as efficiently as possible, the video stream data generated for a vehicle purchase event can facilitate simultaneous performance of multiple activities to be monitored or tracked as a collection of activities associated with the vehicle purchase event.

By automating the monitoring and tracking of an event of interest via recognition and, optionally, identification of one or more pre-defined human and/or object-related activities, the inventors understand that it can be possible to streamline customer service, transactions, and other business relevant activities. Moreover, the ability to automatically monitor or track activities associated with a pre-defined workflow for a business activity using visual AI models, the owner or manager of a business or a specific business process can obtain key performance information for their business using objective data that does not exist currently. In this regard, as noted, activities associated with providing a customer transaction or service event involving a collection of different and inter-related activities are typically in the hands of the individually employees at a business. Owners or managers of the business cannot usually monitor or track each of the employees in real time to make sure that the defined activities associated with an event are in fact conducted. Moreover, several employees are often involved in performing one or more of the activities that make up the event being monitored or tracked. It follows that even if it were possible for an owner or manager to monitor or track each of the employees under his purview in real time, such monitoring would be of the employee, not an event in which the employee is a key participant. Even if the employee performs their assigned tasks perfectly as shown by the acquired video stream data, other aspects of the customer service experienced by the customer may be suboptimal, leading to an overall poor customer service experience. For example, the customer lounge may be dirty, the Wi-Fi may be down, and the coffee station may be empty. It could be expected that such elements of the customer's visit to a dealership might result in the customer being agitated or unhappy, where such activities could be recognized by monitoring or tracking the customer's actions while she is present at the dealership. By defining the subject of video stream content being monitored or tracked as "an event," each human and/or object-related activity defined as relevant to the customer's experience to such defined event can be the subject of visual AI models configurable to detect the presence (or absence) of such activities, as well as the sufficiency of performance of one or more human and/or object-related tasks associated therewith.

In a non-limiting example of an event that may be of interest for monitoring or tracking at a car dealership, a car sale process cycle time can comprise a collection of sub-processes, which can also be characterized as individual "events" that, as a collection, comprise the "top level" event of a car sale process:
  License plate recognition of new vehicle on premise
  Greeting a prospect upon arrival
  Vehicle presentation by sales rep to a customer
  Appraisal of customer's trade vehicle
  Test drive
  Presentation of price and payments
  Sales manager introduction to customer
  Presentation of Finance and Insurance products
  Customer exit As would be appreciated, each of the "sub-events" in the foregoing list can further include additional events. For example, the test drive can comprise the following activities, each of which can be monitored or tracked:
  dealership employee selecting a key from a key storage location
  employee and potential customer walking to a car
  employee hands key to the potential customer
  customer entering the car and driving from the lot
  customer drives car for a period of time
  customer returns to lot
  employee meets customer
  employee retrieves key from potential customer
  employee and potential customer engage in discussion after the test drive
  employee and the potential customer returning to the sales floor (or not)

Other, non-limiting, events that may be of interest for tracking at a car dealership can comprise (each step of which can comprise sub-processes/sub-events):
An Oil Change or "Quick Lube" Service Process:
  License plate recognition
  Greeting
  Service Advisor walk-around
  Vehicle on Technician Rack
  Vehicle leaves Technician Rack
  Vehicle enters car wash
  Active delivery of vehicle back to customer
Customer Satisfaction Alerts
  Not greeted within target time
  Customer unattended/delayed past target time (any specified customer delay)
  Vehicle bottleneck (any specified vehicle delay)
  Vehicle congestion (car wash backed up)
  Tire safety measurement
  Presentation of tire options
  Technician delay at Parts Counter
Safety alerts
  Customer or employee Fall
  Firearm detected
  Vehicle theft
  Vehicle leaves premises without license plate
  Entry to secured document area
Process Automation Points to Eliminate Manual Human Data Entry
  Customer check-in
  Data regarding process completion (e.g. Did Test Drive Occur, etc.)
  License Plate Offer (delivers vehicle value offer to customer and/or dealership employee)

In further implementations, notification(s) can be provided to one or more employees to mitigate potential negative aspects of a delayed customer service event. For example, if a customer is waiting for her car to be washed at a car wash, and a delay occurs, one or more employees can be notified of this event. In such a situation, the employee can be instructed to offer the customer a beverage or to otherwise "run interference" so as to reduce the possibility that the customer will be disappointed or even angry about a delay in the promised delivery of her car.

In other implementations, data associated with or relevant to the event being monitored or tracked can be derived from the acquired video stream data to generate a collection of data that can be used, for example, in modifying or improving subsequent visual AI detection and/or monitoring events. For example, video stream data obtained from a location can itself be used in the development of subsequent visual AI models that have utility for that same location now or in the future. Prior to the use of such data in the development or improvement of subsequent visual AI models, human validation of the data can be provided. As would be appreciated, such human validation can enhance the validity of visual data derived from IP video camera in use at a location.

In further implementations, video stream data for an event of interest can be automatically processed via the visual AI engine and associated functionality to mark or annotate portions thereof. When a particular human and/or object-related activity of interest is recognized in video stream data—or an absence thereof identified—that aspect of the video stream can be marked or annotated. The ability to provide information about the performance of an activity that is expected or intended to occur in an event of interest for monitoring or tracking in a location can enhance the value of the methodology herein The automated human activity recognition and, optionally, identification from video stream among and between a plurality of IP video cameras operational in the disclosed IP video network at a location also has utility in surveillance of a location, such as in the collection of information associated with an event that is of interest for monitoring or tracking, and for which accurate and reliable data is a requirement for action thereon. In this regard, the methodology herein can be useful in generating information that might be relevant to a court action, such as in prosecution of a crime or as evidence in a civil lawsuit.

A current issue in many surveillance products is the need to stitch multiple camera video streams output together to generate a reliable—and therefore legally admissible—collection of information about an event. As described herein, the generation video stream data that follows the entirety of an event and accurately provides evidence of one or more human and/or object activities associated with or relevant to that event when that information is generated from a plurality of IP video cameras can eliminate the previous need for a person to review a plurality of different video streams and stitch the various elements together to generate a single video stream for the event. Also, the automated marking via the visual AI engine of one or more activities of interest can allow automatic notification of the occurrence of an event of interest, which can further enhance the utility of the present disclosure.

Consider, for example, a situation where a person enters a car dealership with a goal or objective of stealing a car. An event of interest for monitoring or tracking by the IP video network installed at the location can be an unauthorized removal of a vehicle from the dealership. When a person enters the dealership, an event can be created, such as potential vehicle purchase. The person associated with that event can be uniquely identified as a potential customer or non-employee according to their skeletal features, gait, clothing etc. That person can be tracked as they move through and among the various IP video cameras present at the dealership. An activity of interest for monitoring or tracking can be the selection of keys (an object) by an employee (a person) from a storage locker (an object). Employees, who can be recognized and identified as such from video stream information, would be authorized persons for the possession of keys at the dealership, whereas other persons may not be allowed to select the keys from a storage location. When an activity of interest for monitoring or tracking at the dealership is selection of keys from a key storage location, the selection thereof by a person who is not recognized and identified as an employee (or other authorized person), the video stream data generated of that activity can be automatically marked. An automated alarm or notification can also be provided to a relevant party.

Of course, the selection of keys by an unauthorized person may not need to trigger an alert of an event unless additional unauthorized activities are detected, such as when the person recognized as being an unauthorized possessor of keys is identified as using the recognized object that is the keys to enter a vehicle recognized as belonging to the dealership and drive it off the lot. The selection of keys by a recognized and identified unauthorized person can generate an event that is a potential vehicle theft and video stream data can be generated for that event. As would be appreciated, each of these activities are likely to be captured by different IP video cameras at the dealership. Even so, the methodology herein can allow the activities of the human, the keys, and the car to be monitored or tracked in relation to a single event at the dealership. If the person consummates a theft of a vehicle, the video stream data generated for that event can provide an accurate and durable record of that theft. In this regard, a substantially continuous collection of video stream data can be derived from each of the individual video streams acquired by each IP video camera to generate a synthetic video stream and/or obtain data therefrom for that event. This synthetic video stream can thus operate to provide a substantially complete record of the event. Moreover, the event that was being monitored or tracked can be marked as a potential vehicle theft for review in real time. Such automated notification and annotation features can also enhance the value thereof for legal purposes. Moreover, while a unique identification for the person may not have included facial recognition, when a person present in video stream data associated with an event of interest is determined to be relevant for enhanced identification, the video stream data can be processed to provide facial recognition data for that person.

The systems and methods herein further comprise libraries of visual AI models that are selectable to provide a collection of visual AI models operational in a location in need of monitoring or tracking of an event for which one or more human and/or object-related activities may be relevant thereto. In this regard, a selection of visual AI models for use in a specific environment can be considered to be "sub-libraries" of larger visual AI model libraries operational in a specific use case. The machine visual AI libraries that are operational on an IP video camera network installed at a location can thus be "fine-tuned" to allow the video stream analysis to focus on one or a plurality of use cases that are relevant to the specific needs of a particular location.

While the systems and methods herein are useful for legacy/existing IP video camera installations, it is expected that newer IP cameras having video analytics processing capabilities built in might also utilize the methodology herein. In this regard, such devices can be configured to transmit an acquired video stream generated by each camera to the GPU server operational with the IP video camera network. Each camera can be configured with video analytics processing capability, however, the processing of collected video stream data associated with or relevant to an event of interest for monitoring can be at the location of the GPU server with which the collection of IP video cameras is operational.

A camera's field of view (FOV) is the area that a camera's lens can capture, or the amount that can be seen from the lens. FOV is measured in degrees and can be represented as horizontal, vertical, or diagonal, as well as the aperture length (zoom level). An aspect of the present disclosure is selection or determination of a FOV for each camera. Such selection or determination of a FOV when setting up each camera for use in a site (e.g., a car dealership, restaurant parking lot, etc.) can enhance imaging information acquisition, at least because the camera can be configured to acquire information associated with an event of interest, while at the same time reducing extraneous imaging information acquisition. For example, a camera's FOV can be determined or selected to allow a camera to focus on an area(s) in a scene or location where a human or object-related activity of interest for monitoring or tracking is more likely to occur. If the activity of interest for monitoring or tracking is entry of a vehicle into a car dealership, a camera acquiring imaging information associated therewith can be configured to acquire imaging information primarily of that part of a scene or location where a vehicle will travel. During set up of the camera for use in the methodology herein, the camera's FOV can be selected or determined so that substantially only those portions of the scene or location that are likely to be associated with the human and/or object-related activity of interest are acquired during an imaging event.

During implementation of the methodology herein, the inventors have recognized that operation of the human and/or object-related activity detection and optionally, identification herein can be negatively affected by a change in the FOV of an IP camera in the multi-camera network. Such FOV can change, for example, if the camera positioning is modified so that the FOV for that camera changes from first time to a second time. Such movement can occur, for example, when an IP camera is mounted on a pole in a parking area, and a vehicle hits the pole or camera to change the positioning thereof from a first position. The FOV can also change if the camera is zoomed in or out in use. When there is a change in a camera's FOV from a first time to a second time, the imaging information captured in a first imaging event and a second imaging event including the same scene or location could be different, thus making use thereof problematic in some implementations. The inventors have determined that the improvements generated by the methodology herein can be facilitated by there being minimal change in the nature of imaging information acquired by a camera in the same scene or location at different times. In this regard, it can be beneficial from time to time to determine if any IP camera in the IP camera network has experienced a change in a FOV in relation to a first or expected FOV.

By way of explanation, the inventors herein have determined that accurate human and/or object-related activity recognition and, optionally, identification can be because movement of a camera alters what information the visual AI system receives from a specific camera. In this regard, in setting up an IP camera network at a location for use with the methodology herein, each camera can be configured to acquire imaging information only for certain areas in an overall visual field for each camera as relevant to operation of the visual AI engine in context. For example, if human and/or object-related activity is associated with a vehicle entering a business location on a road or path associated with the business, the system can be configured to instruct the system to acquire imaging information substantially or fully on the side of the ride that is associated with incoming traffic. The system can be instructed to acquire imaging information that is aligned with the information that is the subject of the human and/or object-related activity recognition and, optionally, identification. In this regard, the system can be configured to substantially not obtain imaging information in a scene or location that is not likely to be associated with the human or object-related activity detection that is relevant to the event of interest. Selection of an area in a scene or location to be acquired by a camera positioned therein can be provided by configuring a camera's FOV in the scene or location at a first time.

To address a possible change in a camera's selected FOV from a first time to a second time, the methodology can determine if a camera in the IP camera network is no longer generating imaging information from the scene or location of interest that is expected to be received. Yet further, the methodology can be configured to adjust a camera's FOV to a previous FOV that was selected at a first time, where the previous FOV corresponds an aspect of a scene or location from which imaging information relevant to a human and/or object-related activity of interest is expected to be generated.

In various implementations, a change in the FOV of a camera in the IP camera network at location of interest for monitoring can be detected prior to start of a human and/or object-related activity recognition and, optionally, identification. Still further, a change in the FOV of a camera in the IP camera network can be detected during a human and/or object-related activity recognition and, optionally, identification. Yet further, a change in the FOV in the IP camera network can be detected after completion of a human or object-related activity recognition and, optionally, identification.

In a first step of the FOV change determination, initial or expected scene or location imaging information for each camera in the IP camera network is located is generated. A plurality of elements in the FOV of a stationary or fixed camera that are expected to substantially be stationary over time or that are associated with non-movable objects in a scene (e.g., fixtures, architectural elements, etc.) can be selected by the system and/or a user as reference objects and imaging information acquired can then be acquired therefore. Processing of the acquired imaging information can be configured to decompose each of the reference objects into polygons using a suitable segmentation method. As would be appreciated, a "polygon" is a plane with at least three straight sides and angles, and typically five or more. In the context of a 2D dimensional image, pixel-perfect polygons can have hundreds to thousands of sides where a "pixel perfect polygon" refers to a polygon shape that is precisely aligned to individual pixels on a screen, meaning its vertices (corners) fall exactly on pixel boundaries.

Figure 6:
FIG. 6 illustrates an example of segmentation of a camera scene, in accordance with various embodiments of the present disclosure.

For simple scenes in which the stationary or non-movable reference elements can easily be classified, a deep learning model may be utilized that to segment each of the visible elements into known classes. For more complex scenes, as may be encountered in the non-standard sites or locations in which the methodology herein is expected to be used, a technique such as FAIR's Segment Anything, can be used. FIG. 6 illustrates an example of segmentation of a camera scene using FAIRs Segment Anything Algorithm (Meta AI).

It should be noted that the camera FOV change methodology herein does not necessitate that the element from the segmentation to be placed into known classes, although classification can be used to provide additional information about the scene in which a subject camera is location. Rather, the placement/shape/size of the polygons generated in each scene or location can be expected to provide sufficient information to allow determination of a change in a camera's FOV from a first or expected FOV.

In a next step of the camera FOV change determination methodology, a sequence of polygon determinations can be made over a period of time from imaging information acquired at the scene or location at those successive times to confirm that the generated polygons are associated with the reference elements. A sequence of polygon determinations can be generated over minutes, hours, or days, depending on a particular use case, with a goal of generating a plurality of polygon views to generate an expected set of polygons in a scene or location, as well as the orientation thereof.

Polygons collected for the same camera positioned in a scene or location are then compared to one another across the different time periods of collection. This comparison examines one or more of the placement, shape, and size of each polygon as derived from the same camera positioned in the scene or location. As noted, the processing can optionally include additional information such as what class of object the polygon represents. Such additional information can provide enhanced information about the scene or location for use in the processes herein, such as to enrich the AI visual models and functionality associated therewith.

A method such as the Turning function, in which the distance between two polygons is calculated, can be used to evaluate a change in positioning of the reference elements in the scene or location as derivable from the arrangements of the polygons. As would be appreciated, the Turning function is a method for measuring the similarity between two-dimensional shapes. The Turning function works by computing the angle of each edge of a polygon in relation to a reference axis. The resulting function is a one-dimensional representation of the two-dimensional shape. In using the Turning function to evaluate a presence or absence of differences—and therefore whether there is a change in a positioning of a camera present in a location—the smaller the distance, the more likely that the polygons are the same.

In a non-limiting example, the distance D between polygons A and B can be calculated as follows:

$$D_p^{A,B} = \int_0^1 |\theta_A(s+t) - \theta_E(s) + \theta|^p ds$$

After the polygons for a camera in a scene or location between at least two times can be examined to determine whether there has been any change in the positioning of the reference objections therein. In particular, such can be determined by evaluating whether a number of matched polygons falls within an expected confidence interval for each matched pair. A typical confidence interval is expressed in a formula in which z can be set to the threshold of interest:

$$\bar{x} \pm z \frac{s}{\sqrt{n}}$$

Polygons in the time periods used for creating the confidence interval can be configured on a rolling window to allow for gradual changes over time—such as differing amounts of daylight due to seasonal fluctuations. Cases in which the number of matched polygons falls outside of a selected confidence interval would then be analyzed as a potential case of where the camera field view has been changed or modified from an expected position.

A change in a distance between polygons A and B can provide an inference that the camera's positioning has changed at least because the reference objects were selected for their likelihood of being stationary in the scene or location. Since different imaging information is obtained from the same scene or location and the same camera, it can therefore be understood that a probable reason for the different scene or location information generated from a single camera results from a change in the camera positioning.

If a determination that a camera's positioning has been changed, a notification can be provided to alert a technician that the subject camera's FOV needs to be adjusted to be aligned with an original or expected FOV and the technician can implement the appropriate modifications. Yet further, if such a determination is made, the system can be configured to automatically adjust the camera as needed.

In an implementation of the camera FOV difference determination process, an acceptable maximum distance between first and second polygon(s) can be configured as a parameter associated with a camera. This can allow a user to select a maximum distance from which a notification of a change in the FOV of a camera may be generated. Selection of a larger acceptable FOV difference for a camera can generate fewer false positives versus selection of a smaller distance. However, selection of a smaller acceptable distance can better ensure that a change in a camera's FOV has not changed.

Figure 7A:
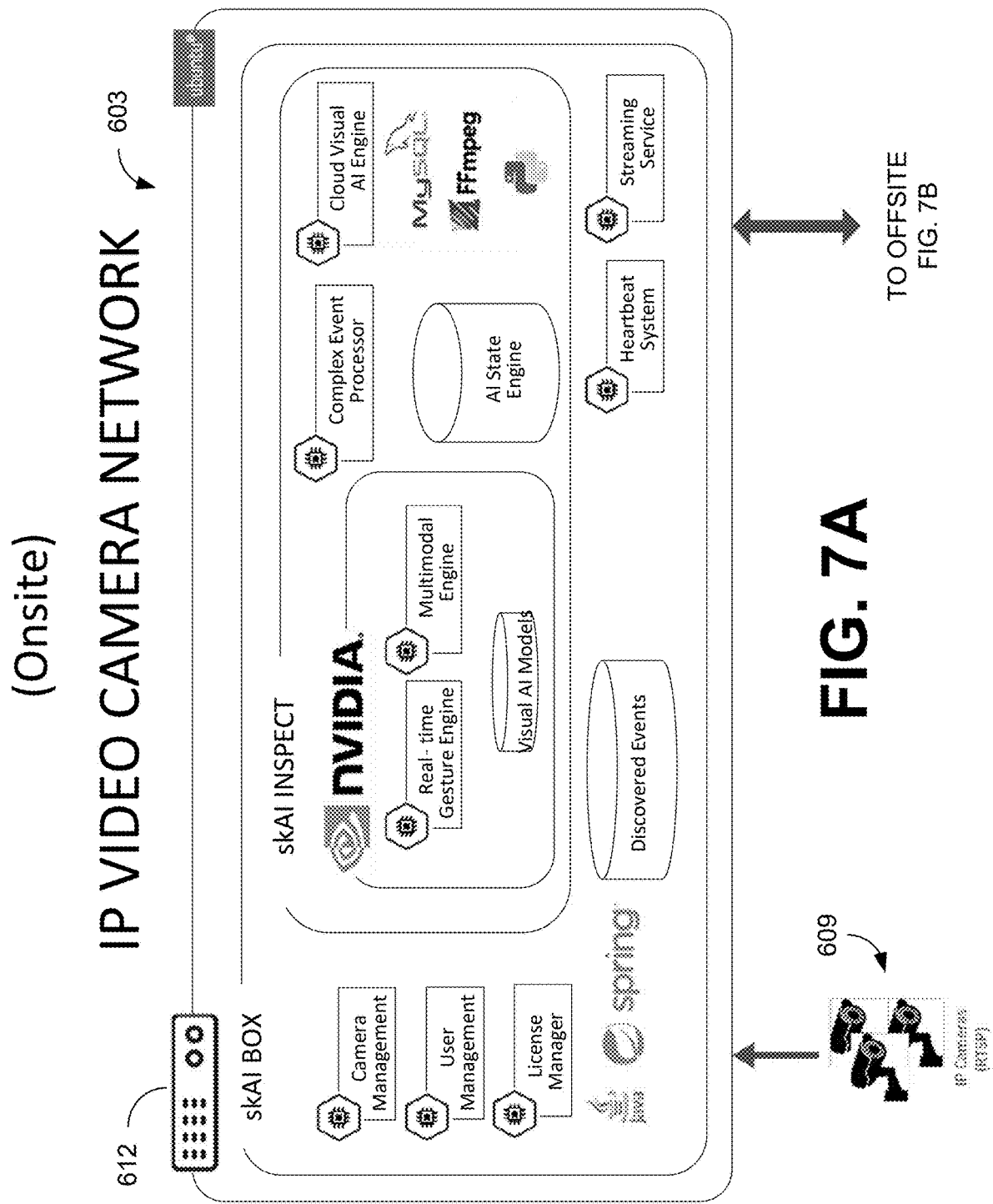
FIGS. 7A-7C illustrate an example of an architecture that can be used in implementations of the processes described herein, in accordance with various embodiments of the present disclosure.
Figure 7B:
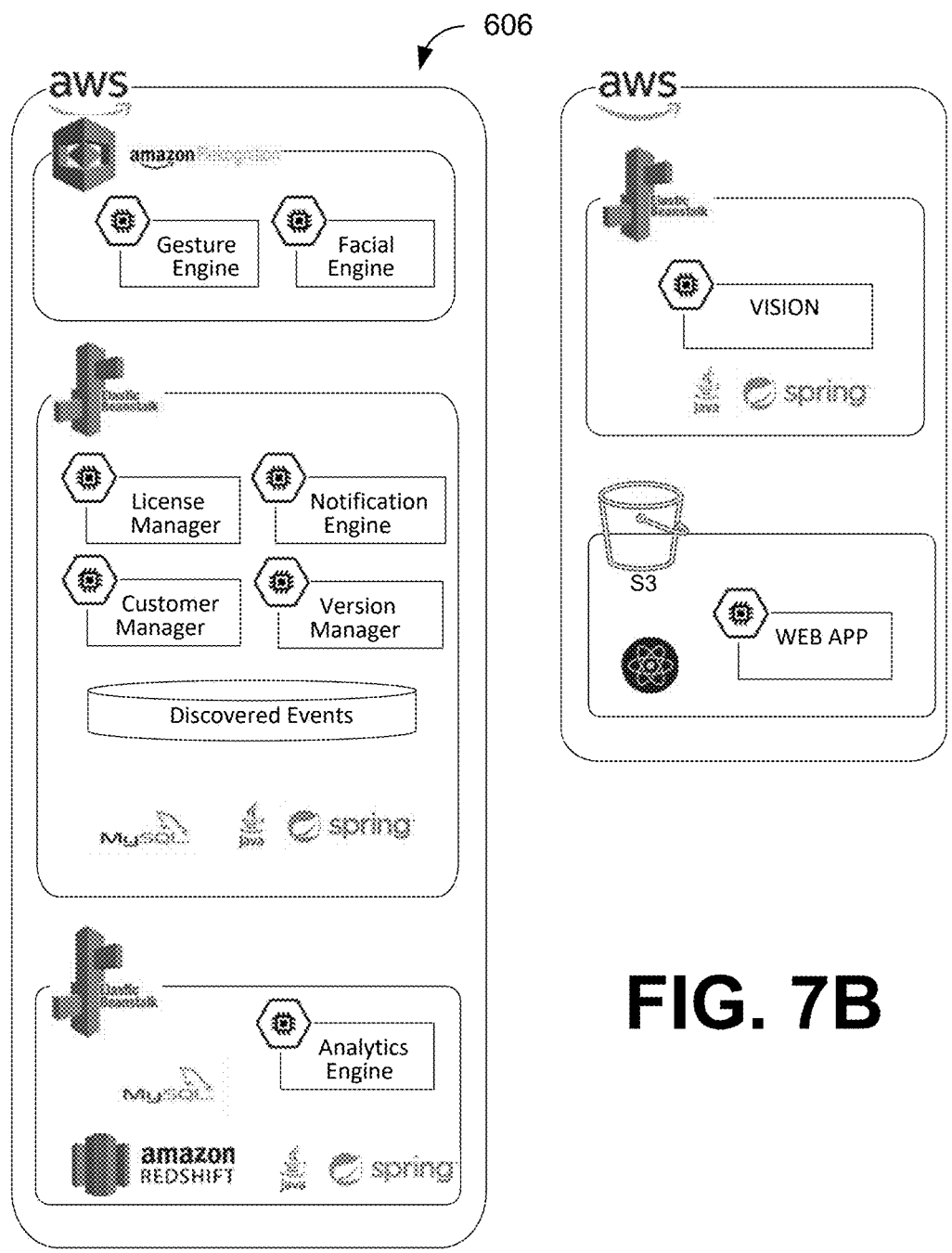
Figure 7C:
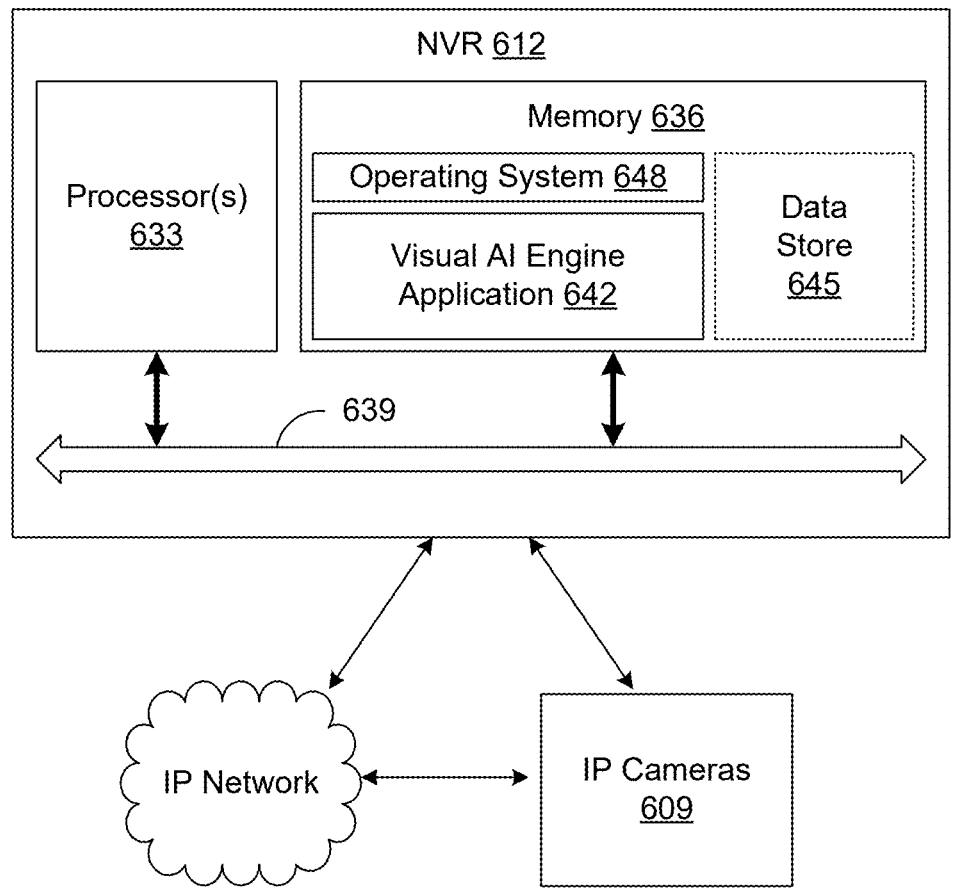

FIGS. 7A-7C illustrate an example of an architecture of the systems and methods herein. The architecture shown in FIGS. 7A and 7B includes an Internet Protocol (IP) video camera network 603 at an onsite location and a cloud network 606 at an offsite location. The IP video camera network 603 can include a plurality of IP video cameras 609 installed at a location of interest for monitoring for human and/or object-related activities. Each IP video camera 609 can be communicatively coupled to a network video recorder ("GPU server") 612 via an IP network, allowing the IP video camera 609 to transmit video files to the GPU server 612. The GPU server 612 can be paired with the IP video cameras 609 to create a video surveillance system. The GPU server 612 comprises processing circuitry and memory that can be configured to acquire video stream data or content from the IP video cameras 609 and store it on a storage device of the GPU server 612 and/or transmit it to the cloud network 606 for storage and/or processing. The GPU server 612 can include camera management and/or user management applications that can configure the GPU server 612 for acquisition and processing of the video stream data or content obtained from the IP video cameras 609. The GPU server 612 can also include heartbeat systems and streaming services to facilitate interfacing with the cloud network 606.

As has been discussed, visual AI can be used to derive meaning from the video stream data or content obtained from the IP video cameras 609 in accordance with one or more algorithms or applications configured for such functionality. The algorithms and/or applications can reside on the GPU server 612, in the cloud network 606, or a combination of both. For example, a visual AI engine can be used to analyze acquired video stream information via a collection of visual AI models configured to identify humans and/or objects in the video stream data or content. An event of interest can be associated with one or a collection of activities that are defined as relevant to the event. Complex event processing can be used to recognize the activities in the video stream data or content for identifying starting and ending points of the events. As shown in FIG. 7A, the GPU server 612 can include a visual AI engine that can utilize real-time human and/or object activity detection engines and/or visual AI models for the detection of activities of interest. For example, real-time gesture, facial and multimodal engines can be used to detect and identify actions or activities present in the video stream information.

The visual AI engine can also include or can be in communications engagement with a cloud visual AI library incorporating a collection of visual AI models and/or detection engines that are available for selection and deployment. Visual AI models derived from discrete identified activities can be used to evaluate the video stream to detect a sequence of activities associated with an event of interest. Information about discovered events can be saved to a datastore in the GPU server 612 and/or in the cloud network 606 as illustrated in FIGS. 7A and 7B. The cloud network can also support other functionality such as, e.g., analytics engines that can provide video analytics processing capability to support legacy/existing IP video cameras or video systems. Cloud vision service can also provide additional vision and web application support services that can be utilized. A cloud-based notification engine can also be used to facilitate real-time generation and distribution of notifications related to detected activities as discussed. In addition, other applications such as license managers, version managers, and customer managers can maintain software applications used in the IP video camera network 603.

Referring to FIG. 7C, shown is an example of a GPU server 612 that may be utilized for the methodology disclosed herein. The GPU server 612 can be one or more computing device(s) or other processing device(s), which includes at least one processor circuit, for example, having a processor 633 and a memory 636, both of which are coupled to a local interface 639. To this end, the GPU server 612 may comprise, for example, a server computer, mobile computing device (e.g., laptop, tablet, smart phone, etc.) or any other system providing computing capability. The GPU server 612 may include, for example, one or more display or touch screen devices and various peripheral devices. Even though the GPU server 612 is referred to in the singular, it is understood that a plurality of GPU servers 612 may be employed in the various arrangements as described above. The local interface 639 may comprise, for example, a data bus with an accompanying address/control bus or other bus structure as can be appreciated.

Stored in the memory 636 are both data and several components that are executable by the processor 633. In particular, stored in the memory 636 and executable by the processor 633 include a visual AI engine application 642 and potentially other applications. Also stored in the memory 636 may be a data store 645 and other data. The data stored in the data store 645, for example, is associated with the operation of the various applications and/or functional entities as described. For example, the data store may include databases, engines, models, object libraries, and other data or information as can be understood. In addition, an operating system 648 may be stored in the memory 636 and executable by the processor 633. The data store 636 may be located in a single GPU server or may be dispersed among many different devices. The components executed on the GPU server 612 include, for example, the visual AI engine application 642 and other systems, applications, services, processes, engines, or functionality not discussed in detail herein. It is understood that there may be other applications that are stored in the memory 636 and are executable by the processor 633 as can be appreciated. Where any component discussed herein is implemented in the form of software, any one of a number of programming languages may be employed.

The GPU server 612 can be configured to communicate with one or more IP camera 609 (e.g., a digital image or video capture device). For example, the IP camera(s) 609 can be communicatively coupled to the GPU server 612 either directly through a wireless communication link or other appropriate wired or wireless communication channel, or indirectly through an IP network (e.g., WLAN, internet, cellular or other appropriate network or combination of networks). In this way, capture video stream information, acquired image information or other information can be communicated between the GPU server 612 and IP camera(s) 609.

A number of software components are stored in the memory 636 and are executable by the processor 633. In this respect, the term "executable" means a program file that is in a form that can ultimately be run by the processor 633. Examples of executable programs may be, for example, a compiled program that can be translated into machine instructions in a format that can be loaded into a random access portion of the memory 636 and run by the processor 633, source code that may be expressed in proper format such as object code that is capable of being loaded into a random access portion of the memory 636 and executed by the processor 633, or source code that may be interpreted by another executable program to generate instructions in a random access portion of the memory 636 to be executed by the processor 633, etc. An executable program may be stored in any portion or component of the memory 636 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 633 may represent multiple processors 633 and the memory 636 may represent multiple memories 636 that operate in parallel processing circuits, respectively. In such a case, the local interface 639 may be an appropriate network that facilitates communication between any two of the multiple processors 633, between any processor 633 and any of the memories 636, or between any two of the memories 636, etc. The local interface 639 may comprise additional systems designed to coordinate this communication, including, for example, performing load balancing. The processor 633 may be of electrical or of some other available construction.

Although the visual AI engine application 642, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Figure 8:
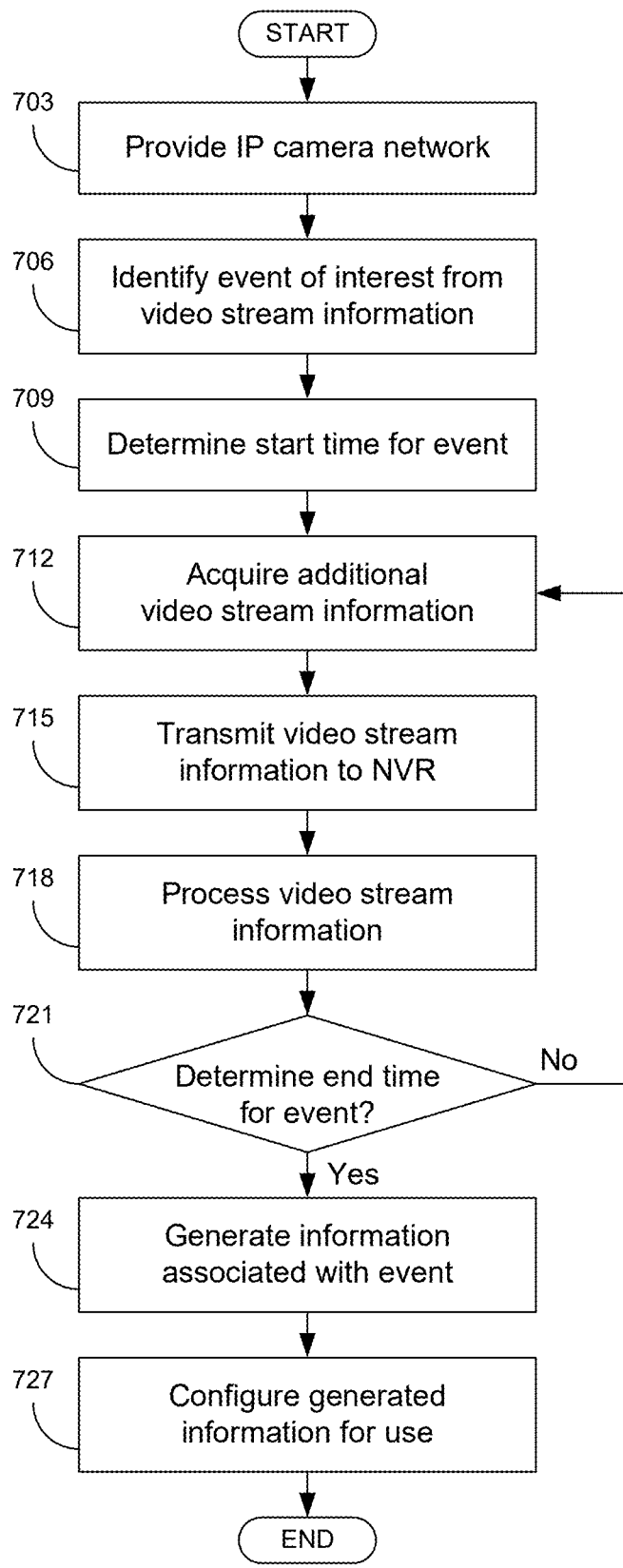
FIG. 8 is a flow chart illustrating an example of a process, in accordance with various embodiments of the present disclosure.

Any logic or application described herein, including the visual AI engine application 642, that comprises software or instructions can be embodied in any non-transitory computer-readable medium for use by or in connection with an instruction execution system such as, for example, a processor 636 in a GPU server or other system. In this sense, the logic may comprise, for example, statements including instructions and declarations that can be fetched from the computer-readable medium and executed by the instruction execution system. The flowcharts or diagrams of FIG. 8 show examples of the architecture, functionality, and operation of possible implementations of a visual AI engine application 642. In this regard, each block can represent a module, segment, or portion of code, which comprises one or more executable instructions for implementing the specified logical function(s). It should also be noted that in some alternative implementations, the functions noted in the blocks may occur out of the order noted in FIG. 8. For example, two blocks shown in succession in FIG. 8 may in fact be executed substantially concurrently or the blocks may sometimes be executed in a different or reverse order, depending upon the functionality involved. Alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Communication media appropriate for use in or with the inventions of the present disclosure may be exemplified by computer-readable instructions, data structures, program modules, or other data stored on non-transient computer-readable media, and may include any information-delivery media. The instructions and data structures stored on the non-transient computer-readable media may be transmitted as a modulated data signal to the computer or server on which the computer-implemented methods of the present disclosure are executed. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term "computer-readable media" as used herein may include both local non-transient storage media and remote non-transient storage media connected to the information processors using communication media such as the internet. Non-transient computer-readable media do not include mere signals or modulated carrier waves, but include the storage media that form the source for such signals.

In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

At this time, there is little distinction left between hardware and software implementations of aspects of systems; the use of hardware or software is generally (but not always, in that in certain contexts the choice between hardware and software can become significant) a design choice representing cost vs. efficiency tradeoffs. There are various information-processing vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

Referring next to FIG. 8, shown is a flow chart illustrating an example of a visual AI process for identifying and monitoring an event of interest. Beginning at 703, an IP camera network 603 is provided operational at a location for monitoring. For example, the location can be a car dealership or other business location. The IP camera network 603 includes a plurality of passive IP enabled video cameras 609 installed at the location, wherein the IP enabled video cameras 609 are in communications engagement with a network video recorder ("GPU server") 612 operational with a visual AI engine. Next, an event of interest can be identified for monitoring at the location at 706. The identification can be generated by acquiring video stream information from one or more of the passive IP enabled video cameras 609, transmitting the video stream information to the GPU server 612, and processing the video stream information via the visual AI engine to determine relevant activities as has been described. At 709, a start time for the identified event of interest is generated.

The process proceeds to 712, where additional video stream information associated with the identified event of interest is acquired via one or more of the plurality of passive IP enabled video cameras 609. The additional video stream information is transmitted to the GPU server 612 at 715 and processed via the visual AI engine at 718 to determine relevant activities of the event of interest. The process of acquiring additional video stream information at 712, transmitting the additional video stream information to the GPU server 612 at 715, and processing the additional video stream information via the visual AI engine at 718 can be continued until an end of the identified event of interest is identified at 721. The end of the identified event of interest can be identified by detection of a human activity that is visible in at least one video stream acquired from an IP camera 609 in the IP camera network.

Information associated with the identified event of interest can be generated at 724 and the generated can be configured for use at 727. For example, the generated information can be rendered for display to a user, e.g., as a report or a dashboard for use by an owner or manager of the dealership or business. The generated information can also be used to generate a notification that can be communicated to one or more persons or users associated with the event of interest. The generated information can also be used for subsequent event detection processes. For example, the information can be saved in a data store and used to generate other AI models for identification of activities.

The foregoing detailed description has set forth various aspects of the devices and/or processes for system configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the aspects disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal-bearing medium include, but are not limited to, the following: a recordable type medium such as a floppy disk, a hard disk drive, a CD, a DVD, a digital tape, a computer memory, etc.; and a remote non-transitory storage medium accessed using a transmission type medium such as a digital and/or an analog communication medium (e.g., a fiber optic cable, a waveguide, a wired communications link, a wireless communication link, etc.), for example a server accessed via the internet.

Those skilled in the art will recognize that it is common within the art to describe devices and/or processes in the fashion set forth herein, and thereafter use engineering practices to integrate such described devices and/or processes into data-processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described herein, the exemplary aspects have been described and illustrated in the drawings and the specification. The exemplary aspects were chosen and described in order to explain certain principles of the invention and their practical application, to thereby enable others skilled in the art to make and utilize various exemplary aspects of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for identifying and monitoring an event of interest via an internet protocol video camera network installed at a location comprising:
   a. providing the internet protocol ("IP") video camera network operational at the location, wherein the IP video camera network comprises a plurality of passive IP enabled video cameras each installed at a plurality of different areas at the location, and wherein each of the plurality of passive IP enabled video cameras are:
      i. in communications engagement with a graphics processing ("GPU") server operational with a visual artificial intelligence engine; and
      ii. configured with a first field of view ("FOV") at a first time, thereby generating expected scene information for each camera;
   b. determining at a second time whether there has been a substantial change in the first FOV of a first camera in the IP video camera network by:
      i. identifying the first FOV for the first camera, wherein the first camera is positioned to acquire imaging information for a scene;
      ii. acquiring imaging information from the first camera at the first time and at the second time;
      iii. selecting one or more reference elements present in the scene from the imaging information acquired at the first time;
      iv. processing the acquired imaging information to decompose the one or more reference elements obtained into polygons, wherein the one or more reference elements are present in the imaging information acquired of the scene at both the first and second times;
      v. locating each of the polygons in the scene at the first and second times;
      vi. comparing location information for the one or more reference elements at the first and second times;
      vii. calculating a change in a location for each of the reference elements from positioning of each of the polygons in the scene at the first and second times, thereby determining whether the first FOV for the first camera has changed from the first to the second time,
   and, if a change in the first FOV for the first camera has substantially changed from the first time to the second time, adjusting the first camera's FOV to substantially align with the first FOV;
   c. detecting an event of interest for monitoring at the location, wherein the event of interest is associated with an activity of one or more humans at the location, and wherein the event of interest is detected by:
      i. acquiring video stream information comprising at least two video streams, wherein each video stream is derived from a different video camera in the IP video camera network;
      ii. transmitting the video stream information to the GPU server; and iii. processing the video stream information via the visual artificial intelligence engine;
d. acquiring additional video stream information associated with the detected event of interest from the second time to a subsequent time;
e. transmitting the additional video stream information to the GPU server;
f. processing the additional video stream information via the visual artificial intelligence engine;
g. generating information associated with the detected event of interest; and
h. configuring the generated information for use in one or more of:
  i. a report or a dashboard for use by an owner or manager of the location;
  ii. a notification to one or more persons associated with the event of interest; or
  iii. subsequent event detection processes.

2. The method of claim 1, wherein:
a. a change in a camera's FOV is detected from the first time to the second time and a notification is provided to a user; and
b. the user is provided with instructions to adjust the camera's FOV to substantially align with the camera's first FOV.

3. The method of claim 1, wherein:
a. a change in a camera's FOV is detected from the first time to the second time and a notification is provided to a user; and
b. the system is configured to adjust the camera's FOV to substantially align with the camera's first FOV.

4. The method of claim 1, wherein:
a. a confidence level is generated for each calculated change in a polygon location; and
b. a FOV adjustment is made to each camera for which a generated confidence level exceeds a pre-determined confidence level.

5. The method of claim 1, wherein the acquired image processing further includes generating classifications for the one or more reference elements.

6. The method of claim 1, wherein the visual artificial intelligence engine is configured to generate a single synthetic video stream associated with the event of interest from the at least two video streams.

7. The method of claim 1, wherein the visual artificial intelligence engine comprises a plurality of individual visual artificial intelligence models configured to recognize either or both of human or object activity associated with the event of interest.

8. The method of claim 7, wherein each of the plurality of individual visual artificial intelligence models are selected from a visual artificial intelligence model library operational with the GPU server.

9. The method of claim 1, wherein the event of interest is detected by recognition of either or both of human-related or object-related activity.

10. The method of claim 9, wherein the recognition is from human-related activity, and the activity comprises movement of one or more body parts of a human visible in the video stream information.

11. The method of claim 10, wherein the human-related activity is detected without use of a sensor associated with the human.

12. The method of claim 9, wherein the recognition is from object-related activity, and the object-related activity comprises movement of one or more objects visible in the video stream information.

13. The method of claim 12, wherein the object-related activity is not detected from sensors associated with the object.

14. The method of claim 1, wherein the plurality of passive IP enabled video cameras are not configured to generate overlapping imagery.

15. The method of claim 1, wherein the event of interest is monitored for a period of time after detection, and wherein the monitoring comprises recognition of either or both of additional human-related or object-related activity.

16. The method of claim 9, further comprising determining an end point for the event of interest, wherein the end point is determined from recognition of either or both of human-related or object-related activity.

17. The method of claim 1, wherein the location comprises a car dealership and the event of interest comprises:
a. a prospective or actual purchase of a vehicle by a customer visiting the car dealership; or
b. servicing or repair of a vehicle present at the car dealership.

18. The method of claim 1, wherein the location comprises a parking location associated with a restaurant and the event of interest comprises a pickup of a food order from the restaurant.

* * * * *